(12) United States Patent
Heck, Sr.

(10) Patent No.: US 8,099,240 B2
(45) Date of Patent: Jan. 17, 2012

(54) BLASTING METHOD

(75) Inventor: Jay Howard Heck, Sr., New Braunfels, TX (US)

(73) Assignee: Live Oak Ministries, New Braunfels, TX (US)

( * ) Notice: Subject to any disclaimer, the term of this patent is extended or adjusted under 35 U.S.C. 154(b) by 0 days.

(21) Appl. No.: 12/890,235

(22) Filed: Sep. 24, 2010

(65) Prior Publication Data

US 2011/0010149 A1  Jan. 13, 2011

Related U.S. Application Data

(60) Continuation of application No. 12/180,302, filed on Jul. 25, 2008, now abandoned, which is a division of application No. 10/911,792, filed on Aug. 3, 2004, now Pat. No. 7,418,373, which is a division of application No. 09/391,831, filed on Sep. 8, 1999, now Pat. No. 6,772,105.

(51) Int. Cl.
*G06G 7/48* (2006.01)

(52) U.S. Cl. ............. 702/6; 702/11; 102/301; 102/302; 102/312; 102/313; 703/2; 703/5; 703/10; 175/2

(58) Field of Classification Search ................ 702/6, 11; 102/301, 302, 312, 313; 703/2, 5, 10; 175/2
See application file for complete search history.

(56) References Cited

U.S. PATENT DOCUMENTS 3,848,927 A * 11/1974 Livingston .................. 299/13

OTHER PUBLICATIONS

Cuderman et al. ("High Energy Gas Fracture Experiments in Fluid-Filled Boreholes—Potential Geothermal Application"), Jul. 1986.*

* cited by examiner

*Primary Examiner* — Sujoy Kundu
(74) *Attorney, Agent, or Firm* — Conley Rose, P.C.

(57) ABSTRACT

Methods for evaluating drill pattern parameters such as burden, spacing, borehole diameter, etc., at a blast site are disclosed. One method involves accumulating the burden contributed by successive layers of rock and matching the accumulated rock burden to a target value for a borehole having a length related to the average height of the layers. Another method relates to varying drill pattern parameters and characteristics to match blast design constraints, including the substitution of one explosive material for another by the proper balance of materials and/or output energies to the associated rock burden. Analysis of deviations from target rock burdens and corrective measures are disclosed, as well as cost optimization methods. The various methods can be practiced using an appropriately programmed general purpose computer.

16 Claims, 8 Drawing Sheets

BLASTING METHOD

RELATED APPLICATION

This application is a continuation application of application Ser. No. 12/180,302 filed Jul. 25, 2008 now abandoned which is a divisional of application Ser. No. 10/911,792 filed Aug. 3, 2004, now U.S. Pat. 7,418,373, which is a divisional of application Ser. No. 09/391,831 filed Sep. 8, 1999, now U.S. Pat. 6,772,105, each of which is hereby incorporated herein by reference in its entirety.

BACKGROUND OF THE INVENTION

1. Field of the Invention

This invention pertains to bench blasting methods and, in particular, to a method of selecting the placement of boreholes along a drill line.

In modern bench blasting, vertical or near vertical holes are drilled adjacent to a rock face and are loaded with explosive charges that are then detonated. The detonation fractures the rock mass between the borehole and the rock face and displaces the resulting fractured rock. The resulting broken rock, known as "muck", is removed and a new free rock face is thus exposed. If the muck contains a desired product, it can be gathered and processed. Otherwise, it may simply be removed from the blasting site to permit further blasting or other activities.

2. Related Art

U.S. Pat. No. 3,377,909 to Grant et al, issued Apr. 16, 1968, discloses the use of a "powder factor" (cubic yards of earth per pound of explosive) to characterize a bore-hole pattern in a coal field strip mine and discloses a "normal" spacing for ANFO (see col. 7, lines 70-71 and 6, lines 63-68).

U.S. Pat. No. 3,848,927 to Livingston, dated Nov. 19, 1974, discloses a trial and error method of determining the optimum and critical depths of a small charge, and teaches the scaling-up of this information for larger charges based on cube root scaling (see col. 7, lines 6-45). This patent suggests matching the charge to the desired size of debris.

U.S. Pat. No. 4,273,049 to Edwards et al, dated Jun. 16, 1981, suggests over-coming the dampening effect of water in a borehole by using water-resistant explosive in the water-containing portions of the borehole and conventional explosives above those portions.

U.S. Pat. No. 4,440,447 to Ricketts et al, dated Apr. 3, 1984, teaches that, in a borehole array for the formation of a retort in oil shale, outer boreholes can be closely spaced and made smaller in diameter to maintain the powder factor (see col. 8, lines 40-53), which is defined as the ratio of energy or explosive used per unit volume of formation explosively expanded in pounds ANFO equivalent per ton of oil shale formation expanded (see column 10, lines 13-17). No explanation of the term "ANFO equivalent" is given.

International Patent Application PCT/GB90/00567, which is incorporated herein by reference or background information, discloses a laser rangefinder device referred to by the trademark QUARRYMAN that can be used to survey a rock face and, when given a borehole pattern by the user, to calculate the burden associated with each borehole. This patent application also discloses a borehole analyzer referred to by the trademark BORETRAK that allows the user to determine the configuration of a borehole as actually drilled.

Prior art methods for assessing the rock hole burden associated with a given borehole or, alternatively, for predicting the optimum positions for boreholes along a rock face, made use only of gross approximations of the burdens associated with the boreholes. Typically, the volume of explosive material in the borehole is calculated and a known conversion factor corresponding to the powder factor disclosed in U.S. Pat. No. 3,377,909 (discussed above) is used to project a volume of rock to be associated with the explosive material in the borehole, i.e., the rock burden. The rock burden is then expressed as a roughly rectangular block, one dimension of which corresponds to the length of the column of explosive material in the borehole, another to the distance of the borehole to the rock face. The projected hole spacing along the drill line can then be derived as the third dimension of the rectangular block. This calculation method is highly inefficient because it does not take into account significant variations in the configuration of the rock face that can occur within the dimensions of the rectangular block associated with the borehole.

SUMMARY OF THE INVENTION

One broad aspect of the present invention pertains to a method for establishing a drill pattern for a plurality of boreholes of predetermined diameter for use with a specified explosive material along a drill line along a bench of rock having a known density and a rock face. The method comprises (a) defining a drill line having a start point and an end point; (b) determining a target rock burden $B_T$ for a hypothetical borehole having the predetermined diameter at the start point; (c) defining along the drill line a progression of successive layers of rock, each layer defining an incremental burden, and determining the cumulative burden $B_{cum}$ of the successive layers and revising $B_T$ with each successive layer until $B_{cum}$ accounts for one-half of $B_T$; (d) setting and indicating a position for the borehole on the drill line in the most distant layer from the start point; (e) defining additional successive layers of rock until the total of the incremental burdens of the layers defined in steps (c) and (e) accounts for $B_T$; (f) setting and indicating a location for a distant boundary of the rock burden for the borehole; and (g) using the distant boundary as the start point for an additional bore-hole and repeating steps (b), (c) (d), (e) and (f) for each additional borehole until a layer coincides with the end point.

In one example, such a method may comprise the foregoing steps (a) and (b) and then (c) defining along the drill line a progression of successive intermediate layers of rock each having a mass less than the target rock burden $B_T$ and being bounded by an intermediate boundary plane and a distant boundary plane and for each intermediate layer (i) calculating a revised $B_T$ based on a hypothetical borehole on the last de-fined boundary plane, and (ii) determining the cumulative burden $B_{cum}$ of the defined incremental intermediate layers until $B_{cum}$ accounts for one-half of $B_T$ and then setting and indicating the location of a borehole on the drill line in the last defined layer (referred to as the "central layer"); (d) defining along the drill line a progression of successive distant layers of rock, and accumulating the rock burdens of the layers until the total rock burden accumulated in steps (c) and (d) accounts for $B_T$; (e) setting and indicating a location for a distant boundary of the rock burden for the borehole; and (f) using the distant boundary as a start point and returning to steps (b)-(e) until an incremental layer coincides with the end point.

Optionally, the position of the borehole may be set between the planar boundaries of the central layer by interpolation or on one of the boundaries.

Another aspect of this invention relates to a method for proposing a drill pattern comprising positions for boreholes of predetermined diameter for use with a specified explosive material along a drill line along a bench of rock having a known density and rock face. The method comprises (a) defining a drill line having a start point and an end point; (b) determining a target rock burden ($B_T$) for a hypothetical borehole having a height corresponding to the start point; (c) defining along the drill line a progression of successive layers of rock each having a mass less than $B_T$ and each being bounded by planar cross sections of the bench and having an intermediate boundary plane and a distant boundary plane, determining the cumulative burden $B_{cum}$ of the defined layers, and calculating an average height of the layers with each successive layer; (d) using the average height to calculate a revised $B_T$ for the hypothetical borehole; and (e) repeating steps (c) and (d) until $B_{cum}$ accounts for $B_T$ and then indicating the location of a borehole on the drill line between the start point and the most distant layer, and using the distant boundary of the most distant layer as a start point and returning to step (b) until a layer coincides with the end point.

According to one aspect of the invention, calculating the average height of the incremental layers may comprise defining spaced parallel planes that define layer boundaries and taking the average height of the planes.

According to another aspect of the invention, the rock mass of a layer may be calculated as the rock density multiplied by the volume of the layer and the volume may be calculated as one-half of the sum of the surface areas of the planes bounding the layer multiplied by the spacing between the planes.

According to still another aspect of the invention, determining $B_T$ may comprise determining the amount of the specified explosive material that would be loaded in the hypothetical borehole, converting the amount to a corresponding quantity of a reference explosive material and calculating a target burden associated with the corresponding quantity of the reference explosive material. Optionally, converting the amount to a corresponding quantity of a reference explosive material may comprise scaling the mass of the specified explosive material by the relative magnitudes of the specific energies of the specified explosive material and the reference explosive material. In a particular embodiment, calculating the target burden may comprise determining a Material Factor for the reference explosive material and multiplying the corresponding quantity by the Material Factor.

According to yet another aspect of the invention, determining $B_T$ may comprise determining an Energy Factor for the rock burden and relating the rock burden to the amount of explosive material that would be in the hypothetical borehole using the Energy Factor.

The method of this invention may optionally include designating blast design constraints comprising minimum and maximum values for hole-to-rock face burden, hole spacing and at least one of a Material Factor and Energy Factor and determining and indicating for each borehole whether the constraints are met. Optionally, the drill pattern characteristics of each borehole may be determined on a section-by-section basis for each borehole. The method may further include analyzing deviations of drill pattern characteristics from the constraints to evaluate at least one of the drill line distance and drill line orientation relative to the rock face and indicating the evaluation. Optionally, the method may include identifying and reporting each borehole having an excess toe burden or a swell or a hollow in the rock face.

The present invention further provides a method for determining a priority-directed loading configuration for a borehole subject to blast design criteria. This method comprises (a) selecting a segment of the explosive column portion of the borehole to be filled with explosive material; (b) determining the rock burden associated with the identified segment; (c) evaluating candidate explosive materials for use in the identified segment in order of priority until one is found that meets the blast de-sign criteria (referred to herein as a compliant material), and assigning the first compliant material to the selected segment, assigning stemming to the segment when all the candidate explosive materials fail to meet the minimum energy factor criterion and indicating "unknown" when all the candidate explosive materials exceed the maximum energy factor criterion; and (d) repeating steps (a), (b) and (c) for each segment of the explosive column. Optionally, the explosive materials may be evaluated in order of cost to generate a cost-directed loading configuration. Alternatively, the explosive materials may be evaluated in order of specific energy. In a particular embodiment, the method may comprise assigning stemming to the segment when each evaluated explosive material provides less than a minimum energy factor criterion for the rock burden. The method may optionally further comprise indicating whether all candidate explosive materials exceed the maximum energy criterion for a segment of the borehole.

The present invention also provides a method for choosing at least one explosive material for use in at least a segment of a borehole, the method comprising determining a target specific volume energy required for an explosive material in the borehole; and identifying at least one explosive material that provides at least the target specific volume energy. This method of the present invention may comprise comparing the specific energies of candidate explosive materials to the target specific volume energy, which may optionally comprise referring to stored data that indicate specific volume energies of a plurality of explosive materials. The stored data may indicate the densities and specific mass energies of the various candidate explosive materials, and identifying an explosive material may comprise calculating the specific volume energy of a candidate explosive material and comparing the candidate specific volume energy to the target specific volume energy.

Optionally, the method may comprise partitioning the borehole into segments and determining rock burden and target specific volume energy for various segments of the borehole and separately identifying an explosive material for each segment. In a particular embodiment, the method may further comprise determining the rock burden for the borehole and using a predetermined Energy Factor and the size of the borehole to determine the corresponding specific volume energy.

Another method of the present invention relates to evaluating the suitability of a candidate explosive material of known specific energy for use in at least a segment of a borehole having a predetermined diameter and having a rock burden associated therewith by identifying a reference Material Factor ($MF_R$) for the rock burden associated with the borehole with reference to a reference explosive material of known specific energy; calculating an adjusted Material Factor ($MF_A$) corresponding to the use of the candidate explosive material in the borehole; and comparing the adjusted Material Factor ($MF_A$) to the reference Material Factor ($MF_R$). Calculating the adjusted Material Factor ($MF_A$) may comprise multiplying the reference Material Factor ($MF_R$) by $(M_{Ref})(E_{Ref})/(M_{EXP})(E_{EXP})$; wherein $M_{Ref}$=the mass of reference explosive in the section of the borehole; $M_{EXP}$=the mass of candidate explosive in the section of the borehole; $E_{ref}$=the specific mass energy of the reference explosive; and $E_{EXP}$=the specific mass energy of the candidate explosive, so that $MF_A=MF_R((M_{Ref})(E_{Ref})/(M_{EXP})(E_{EXP}))$.

The present invention also provides a method for selecting the diameter of a borehole by (a) determining the rock burden associated with at least a segment of the borehole; (b) determining a target Energy Factor $EF_T$ for the rock burden; (c) selecting an explosive material of known specific volume energy; and (d) calculating the diameter of the borehole needed to accommodate a volume of the explosive material sufficient to attain at least the target Energy Factor $EF_T$.

The present invention further provides a computer-readable medium having computer-executable code therein for assigning positions for boreholes of predetermined diameter for use with a specified explosive material along a primary drill line along a bench of rock having a known density and having a rock face. Such a medium comprises (a) code responsive to user input defining a drill line having a start point and an end point; (b) code for determining a target rock burden $B_T$ for a hypothetical borehole having a height corresponding to the start point; (c) code responsive to data reflecting a model of the bench for defining along the drill line an incremental layer of rock having a mass less than $B_T$ and having an intermediate boundary and a distant boundary, determining the cumulative burden $B_{cum}$ of the defined incremental layers, and the height of the layer at the distant boundary; (d) code for using the height at the distant boundary to calculate a revised $B_T$; (e) code for causing the further execution of code (c) and code (d) until $B_{cum}$ accounts for one-half $B_T$; (t) code for setting and indicating the location of a borehole on the drill line between the intermediate boundary and the distant boundary of the last incremental layer when $B_{cum}$ accounts for $B_T$; (g) code responsive to said data for defining along the drill line further incremental layers of rock until $B_{cum}$ accounts for $B_T$; and (h) code for setting and indicating the position of the distant boundary of the rock burden associated with the borehole, and until the position of any previously accumulated layer exceeds the end point, for using the distant boundary of the rock burden as a start point and repeating the code of parts (b)-(g).

Further still, this invention relates to a computer-readable medium comprising (a) code responsive to user input defining a drill line having a start point and an end point; (b) code for determining a target rock burden $B_T$ based on a hypothetical bore-hole having the predetermined diameter at the start point; (c) code responsive to data reflecting a model of the bench, for defining along the drill line a progression of successive intermediate layers of rock each having a mass less than the target rock burden $B_T$ and being bounded by an intermediate boundary plane and a distant boundary plane and for each proximal layer (i) calculating a revised $B_T$ based on a hypothetical borehole on the last defined distant boundary plane and (ii) determining the cumulative burden $B_{cum}$ of the defined intermediate until $B_{cum}$ accounts for about one-half of $B_T$ and then setting and indicating the location of a borehole on the drill line in the last defined layer (referred to as the "central layer"); (d) code for defining along the drill line a progression of successive distant layers of rock, and accumulating the rock burdens of the distant layers until the total rock burden accumulated in steps (c) and (d) accounts for about $B_T$; (e) code for setting and indicating the distant boundary of the rock burden for the borehole; and (f) code for using the distant boundary as a start point and repeating steps (b)-(e) until an incremental layer coincides with the end point.

The medium may optionally further comprise code for determining the position of the borehole between said intermediate and distant boundaries by interpolation.

In an alternative embodiment, the medium may comprise (a) code responsive to user input defining a drill line having a start point and an end point; (b) code for determining a target rock burden ($B_T$) for a hypothetical borehole having a height corresponding to the start point; (c) code responsive to data reflecting a model of the bench for defining along the drill line an incremental layer of rock having a mass less than $B_T$ and having a distant boundary, determining the cumulative burden ($B_{cum}$) of the defined incremental layers, and calculating an average height of the incremental layers with each successive layer; (d) code for using each average height to calculate a revised $B_T$ for the hypothetical borehole; (e) code for comparing $B_{cum}$ to $B_T$ for each successive layer and then for causing the further execution of code (c) and code (d) if $B_{cum}$ is less than $B_T$; (f) code for setting and indicating the location of a borehole on the drill line between the intermediate boundary and the distant boundary of the last incremental layer when $B_{cum}$ is not less than $B_T$, and using the distant boundary of the last incremental layer as a start point in response to code (e) when $B_{cum}$ is not less than $B_T$; and (g) code for comparing each incremental layer to the end point and for causing the execution of code (b)-(e) until an incremental layer coincides with the end point.

Optionally, the code (c) for calculating the average height of the incremental layers may comprise code for defining spaced parallel planes that define layer boundaries and taking the average height of the planes. Also, the code (c) for determining $B_{cum}$ may include code for calculating the volume of the layer as one-half of the sum of the surface areas of the planes bounding the layer multiplied by the spacing between the planes, and for calculating the rock mass by multiplying the rock density by the volume. The code (d) may include code for determining the amount of the specified explosive material that would be loaded in the hypothetical borehole, determining the quantity of a reference explosive material corresponding to the calculated volume of a specified explosive material and calculating a target burden associated with the corresponding quantity of the reference explosive material. The medium may comprise code for scaling a mass of a specified explosive material by the relative magnitudes of the specific energies of the specified explosive material and the reference explosive material. Code for calculating the target burden may comprise code for determining a Mass Factor for the reference explosive material and multiplying the corresponding quantity by the Mass Factor.

The medium may comprise code for determining $B_T$ by determining an Energy Factor for the rock burden and relating the rock burden to the amount of explosive material that would be in the hypothetical borehole using the Energy Factor.

There may also be code in the medium for designating blast design constraints comprising minimum and maximum values for hole-to-rock face burden, hole spacing and at least one of a Material Factor and Energy Factor, and for determining the drill pattern characteristics of each borehole and comparing the characteristics to the constraints and indicating whether the constraints are met. Optionally, there may be code for determining the drill pattern characteristics of each borehole on a section-by-section basis for each borehole. There may also be code for analyzing deviations of drill pattern characteristics from the constraints to evaluate at least one of the drill line distance and drill line orientation relative to the rock face and reporting the evaluation. Optionally, the medium may comprise code for identifying and reporting each borehole having an excess toe burden, and/or a swell or hollow in the rock face.

The invention also provides a computer-readable medium having computer-readable code therein for choosing at least one explosive material for use in at least a segment of a borehole having a rock burden associated therewith, comprising code for determining a target specific volume energy required for an explosive material relative to the associated rock burden; and code for identifying at least one explosive material that provides at least the target specific volume energy. Such medium may comprise code for referring to stored data indicating the specific energies of candidate explosive materials and comparing the data to the target specific volume energy. The data may indicate the specific volume energies of a plurality of blends of two or more materials. Alternatively, the medium may comprise data indicating the densities and specific mass energies of the various candidate explosive materials, and may comprise code for calculating the specific volume energy of a candidate explosive material and comparing the candidate specific volume energy to the target specific volume energy. Optionally, the medium may comprise code for partitioning the borehole into segments and determining rock burden and target specific volume energy for various segments of the borehole and separately identifying an explosive material for each segment. There may be code for determining the rock burden for the borehole and using a pre-determined Energy Factor and the size of the borehole to determine the required specific volume energy.

Still another aspect of this invention relates to a computer-readable medium having computer-readable code therein for evaluating the suitability of a candidate explosive material of known specific energy for use in at least a segment of a borehole having a predetermined diameter and having a rock burden associated therewith, the code comprising code responsive to data indicating the specific energy of reference explosive material and a target rock burden to determine a reference Material Factor ($MF_R$) for the rock burden associated with the borehole; code responsive to data for a candidate explosive material for calculating an adjusted Material Factor ($MF_A$) corresponding to the use of the candidate explosive material in the borehole; and code for comparing the adjusted Material Factor ($MF_A$) to the reference Material Factor ($MF_R$) and for indicating the result. The medium may comprise code for calculating the adjusted Material Factor ($MF_A$) by multiplying the reference Material Factor ($MF_R$) by $(M_{Ref})(E_{Ref})/(M_{EXP})(E_{EXP})$; wherein $M_{Ref}$=the mass of reference explosive in the section of the borehole; $M_{EXP}$=the mass of candidate explosive in the section of the borehole; $E_{Ref}$=the specific mass energy of the reference explosive; and $E_{EXP}$=the specific mass energy of the candidate explosive material.

Further still, the present invention provides a computer-readable medium having a computer-executable code therein for selecting the diameter of a borehole, the code comprising (a) code for accepting rock burden data associated with at least a segment of the borehole; (b) code for accepting a target Energy Factor for the rock burden $EF_T$; (c) code for accessing data pertaining to the specific energy of an explosive material; and (d) code for calculating the diameter of the borehole needed to accommodate a volume of the explosive material sufficient to attain the target Energy Factor $EF_T$.

The present invention further relates to a method for using a computer to assign positions for boreholes at a bench blasting site having a rock face, comprising inputting data indicating bench characteristics indicating at least bench height, bank angle, rock face configuration and rock density; inputting blast design constraints pertaining to spacing, hole-to-rock face burden, explosive material properties, desired borehole angle, at least one of Material Factor and Energy Factor; inputting a proposed drill line, start point and end point; and receiving a report containing proposed drill pattern characteristics.

In one embodiment of the invention, the report may identify boreholes having excess toe burdens and the method may further comprise inputting data indicating the placement of boreholes in the toe and receiving a report indicating positions for boreholes on the drill line. Optionally, the report may identify boreholes having rock face swells and the method may comprise inputting data indicating the elimination of at least one borehole position and the addition of at least one borehole on a swell between the drill line and the rock face.

Another method aspect of this invention relates to a method for assigning a cost-directed spacing to a borehole of predetermined diameter on a drill line along a bench of rock having a known density and a rock face, each location and borehole being subject to blast design criteria including a minimum spacing criterion, a maximum spacing criterion, and a minimum energy factor. The method comprises (i) proposing a compliant spacing for a borehole on the drill line with reference to at least one associated burden boundary; (ii) associating with the borehole a rock burden determined in part relative to the at least one burden boundary; (iii) determining a cost-based loading configuration for the borehole according to the method described above and recording the resulting compliant configuration (if any) and determining its associated cost; (iv) proposing a different compliant spacing with a corresponding borehole-boundary distance; (v) repeating step (ii), (iii) and (iv) for each different compliant spacing; and (vi) identifying the compliant spacing with the lowest cost (on a dollar per ton basis) compliant loading configuration (referred to as the cost-directed spacing). Step (vi) may optionally comprise identifying the location of the borehole and of the first and second boundaries of the rock burden associated with the cost-directed spacing. The method may optionally be repeated by using a boundary associated with the cost-directed spacing as a fixed boundary for the rock burden of a subsequent borehole on the drill line to assign a cost-directed spacing to the subsequent borehole. In one embodiment, the method may comprise first proposing in step (i) a spacing that corresponds to the minimum spacing criterion and proposing in step (iv) an incrementally larger spacing than was used in the previous steps (ii) and (iii). Alternatively, the method may comprise proposing in step (ii) a spacing that corresponds to the maximum spacing criterion and proposing in step (iv) an incrementally smaller spacing than was used in the previous steps (ii) and (iii).

This invention also provides a computer-readable medium having computer-executable code therein, comprising (a) code for selecting a segment of the explosive column portion of a borehole to be filled with explosive material; (b) code for determining the rock burden associated with the selected segment and for accessing data pertaining to blast design criteria comprising minimum and maximum energy factors and for accessing data pertaining to candidate explosive materials; (c) code for evaluating candidate explosive materials for use in the selected segment in order of priority until one is found that meets the blast design criteria (referred to herein as a compliant material), and for assigning the first compliant material to the selected segment, for assigning stemming to the segment when all candidate explosive materials fail to meet the minimum energy factor criterion, and for indicating whether all the candidate explosive materials exceed the maximum energy factor criterion; and (d) code that causes code (a), (b) and (c) to repeat for each segment of the explosive column. Optionally, there may be code for evaluating explosive materials in order of cost to generate a cost-directed loading configuration. There may be code for evaluating explosive materials in order of specific energy.

The invention further provides a computer-readable medium having computer-executable code therein for assigning a cost-directed spacing to a borehole of predetermined diameter on a drill line along a bench of rock having a known density and a rock face, the spacing and borehole being subject to blast design criteria including minimum spacing, maximum spacing, and minimum and maximum energy factors, the medium comprising (i) code for accessing data relating to the configuration of a bench and to blast design criteria comprising minimum and maximum energy factors and data comprising energy and cost characteristics of candidate explosive materials; (ii) code responsive to user input defining on the bench a drill line having a drill line start point and a drill line end point; (iii) code for proposing a compliant spacing for a borehole on the drill line with reference to at least one burden boundary; (iv) code for associating with the borehole a rock burden determined in part relative to the at least one burden boundary; (v) code for determining a cost-based loading configuration for the borehole as described herein and for indicating the resulting compliant configuration (if any) and determining its associated cost; (vi) code for proposing a different compliant spacing with a corresponding borehole-boundary distance and for causing code (iv) and (v) to repeat for each different compliant spacing; and (vii) code for indicating the compliant spacing with the lowest cost (on a dollar per ton basis) compliant loading configuration (referred to as the cost-directed spacing). The medium may optionally comprise code for indicating the location of the borehole and of the first and second boundaries of the rock burden associated with the cost-directed spacing. Also optionally, the medium may comprise code for using a boundary associated with the cost-directed spacing as a boundary for the rock burden of a subsequent borehole on the drill line and executing the code of parts (iii)-(vii) to assign a cost-directed spacing to the subsequent borehole.

The invention also provides apparatuses for assigning positions for boreholes of predetermined diameter for use with a specified explosive material along a primary drill line along a bench of rock having a known density and a rock face. The invention also provides apparatuses for choosing at least one explosive material for use in at least one segment of a borehole having a rock burden associated therewith, and apparatuses for selecting the diameter of a borehole. Each such apparatus comprises a computer processor; storage media accessible to the processor, for storing data and executable code; input means for delivering data to the at least one storage medium as described above; and output means for conveying data representing locations for boreholes, identifying an explosive material for use in a borehole segment and/or representing a selected diameter for a borehole, as appropriate.

The method of this invention may provide for reducing the cost of a blast pattern by (a) broadening at least one constraint by an acceptable degree to yield revised constraints; (b) proposing a hole position at a minimum spacing constraint; (c) evaluating a hole at that position for compliance with the revised constraints and calculating and recording the cost per unit burden mass for blasting at that position; (d) proposing another position for the hole at a different compliant spacing; (e) repeating steps (c) and (d) until the constraints are no longer met, then (f) evaluating the calculated costs per unit burden mass and indicating the spacing having the lowest cost per unit burden mass. The method may optionally include (g) proposing the next borehole at the minimum spacing from the previous hole; and (h) repeating the evaluation of steps (c)-(g) until the end point is reached.

Inputting data for the practice of any invention disclosed herein may comprise retrieving data from a memory medium, transferring data from an electronic surveying device, and/or entering data via a user input device. Setting data may comprise determining its value, e.g., setting a position or location for a borehole or boundary comprises determining, e.g., by approximate calculation, the proper position or location. Indicating data, such as the output of a computer program representing a location or position or the result of a comparison between two or more given values, may comprise displaying the data, recording the data for future retrieval and/or sending the data to another electronic device.

DETAILED DESCRIPTION OF THE INVENTION AND PREFERRED EMBODIMENTS THEREOF

Figure 1:
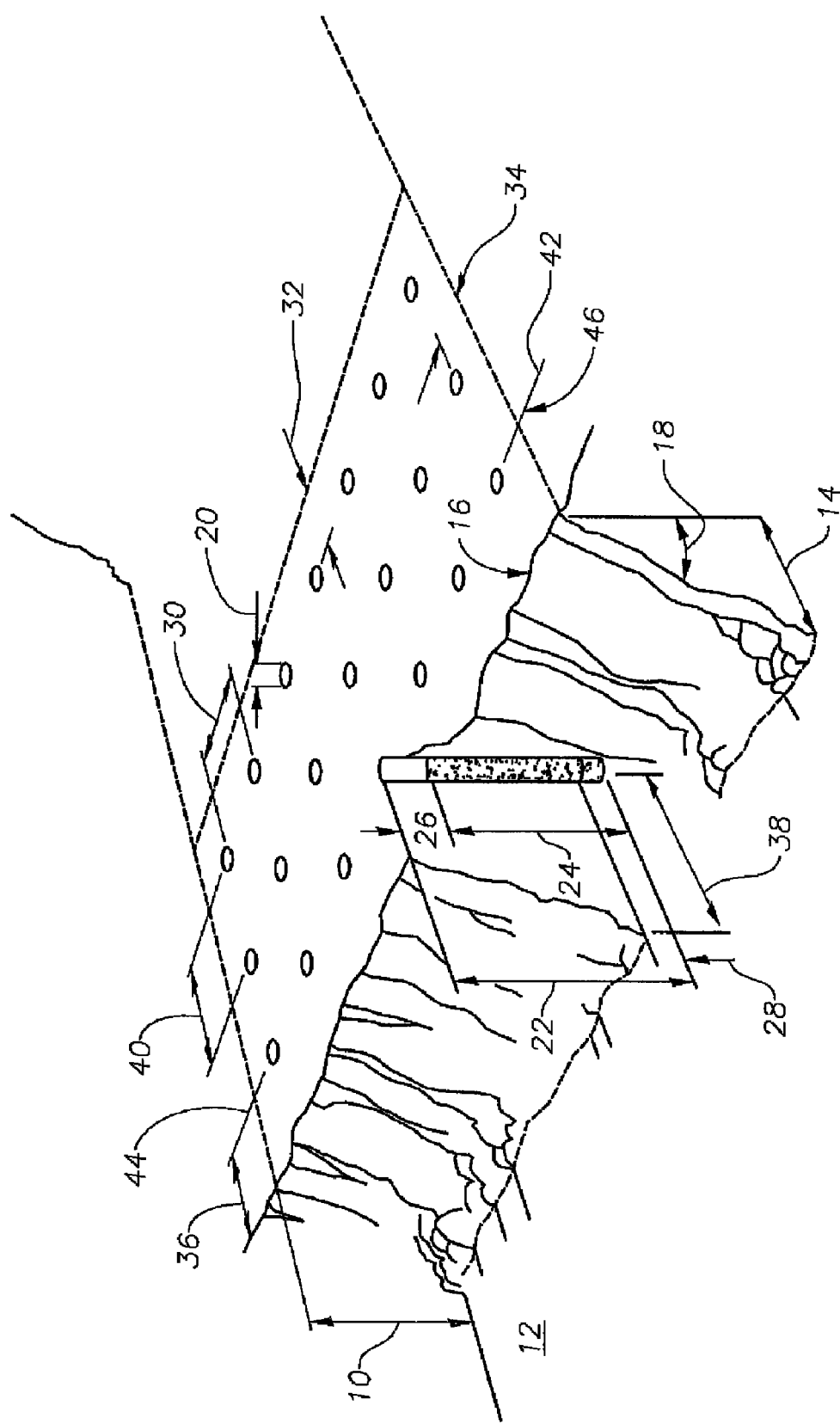
FIG. 1 is a perspective view of a bench to be blasted, showing various characteristics of the bench and the boreholes therein.

The present invention provides a method and apparatus for determining the optimum placement of boreholes along a drill line for a rock face. The invention permits the use of, and may be embodied as improvements to, prior art devices such as the QUARRYMAN® and BORETRAK® systems which previously merely facilitated a trial-and-error assessment of borehole patterns chosen by the user. Such prior art devices had no provision therein to suggest to the user the appropriate positions for boreholes based on selected parameters pertaining to the blast site as provided by the invention described herein.

The present invention provides a significant improvement to prior art practice by providing an iterative method for assessing the rock burden associated with a borehole. As a result of the use of this method, which is described more fully below, the rock burden associated with a particular borehole is very closely matched to the explosive material planned for use in the borehole. Accordingly, burden-related factors such as rock size distribution can be carefully controlled so that inadequate use and/or excessive use of explosive material can be avoided to a degree not realized in prior art practice.

In accordance with one embodiment of the present invention, the user generates a model of a bench to be blasted; this may be a numeric model produced by an electronic surveying device such as the QUARRYMAN® device. The user selects a drill line and indicates a boundary thereon to delineate the start of the blast area, the boundary providing a start point for the analysis. The model is used to calculate the cross-sectional area of the bench at the start point as the area of a first plane disposed perpendicular to the drill line. The height of the first plane at the drill line is determined and is used to establish a hypothetical height for a borehole and, therefore, a hypothetical loading of explosive. A layer of rock is defined between the first planar cross section of the bench and a second plane parallel to the first, the horizontal (top) and vertical faces of the rock face, ground level at the bottom of the borehole and a planar boundary through the drill line at an angle corresponding to the borehole angle, or at another angle designated by the user. The thickness of the layer along the drill line is chosen so that the volume of rock therein is expected to be significantly less than the target burden to be associated with the hypothetical borehole, typically not more than twenty percent thereof, preferably about ten percent of the target burden. Alternatively, the thickness of the layers is chosen to be about one-tenth of the desired minimum spacing for the blast. A thickness of two feet is suitable as a default. The layer is thus bounded by two parallel planes that are preferably disposed perpendicularly to the drill line: an intermediate boundary plane and a distant boundary plane, the terms "intermediate" and "distant" indicating their relative proximity to the start point. The height of the distant boundary plane at the drill line is used to calculate a length for the hypothetical borehole and the amount of explosive therein and the target burden $B_T$ for the borehole are then recalculated using the revised borehole length. The incremental burden associated with the layer is calculated and compared to the target burden. If the incremental burden is less than one-half of the target burden, another layer is added by defining another plane parallel to the last and the height of the new plane is used to calculate a revised length for the hypothetical borehole and the target burden for the borehole is again recalculated. With each added layer, the incremental burdens of the previously defined layers are added together and compared to the target burden for the borehole as most recently revised. As long as the accumulated burden is less than one-half of the target burden, an additional layer is added and the recalculation of the target burden based on the revised height of the borehole is performed. When the accumulated burden "accounts for", i.e., substantially meets (e.g., is within about 1% of the accumulated burden), or exceeds, one-half of the target burden, the position of the borehole is set within the last defined layer. The layers between the start point and the borehole are referred to as "intermediate" layers. Preferably, the position of the borehole within the last defined layer is fixed by interpolation to identify the position on the drill line at which the accumulated burden of the intermediate layers precisely matches or at least more closely approximates the target burden. Once the borehole position is set, a first boundary plane through the borehole location is defined and additional layers, referred to as "distant layers", are added and their incremental burdens are accumulated without revising the length or target burden of the borehole. When the total accumulated burden of the intermediate burden layers and the distant burden layers accounts for, i.e., meets or exceeds, the target burden for the borehole, the distant boundary of the rock burden for that borehole is set. Preferably, the position of the distant boundary is determined by interpolation to identify the position at which the total accumulated burden matches or closely approximates the target burden for the borehole. Optionally, once the position of the borehole has been set, the previously accumulated burden of the intermediate burden layers may be cleared and the burdens of the distant layers may be accumulated until the total distant burden likewise accounts for one-half of the target burden for the borehole. Alternatively, the incremental burdens of the distant layers can be added to the accumulated burdens of the intermediate layers until $B_T$ is accounted for. In any of the foregoing approaches, the method comprises accumulating incremental burdens along the rock face beginning at a start point until about one-half of the target burden (the "intermediate half" of the target burden) is accounted for, and then adding burdens of incremental layers on the "distant" side of the borehole until the other half of the target burden (the "distant half" of the target burden) is accounted for. Once the distant boundary of the rock burden for a borehole is set, the distant boundary is used as a start point for positioning the next borehole and subsequent layers are measured therefrom. The procedure is repeated until the end point is met or exceeded.

In an alternative embodiment, the average of the heights of the cross-sectional planes is calculated and is used to calculate a revised length for the hypothetical borehole and amount of explosive therein, and the target burden $B_T$ for the borehole is re-calculated. One by one, additional layers are defined by additional planes and are associated with the hypothetical borehole. The burden contributed by each layer (the "incremental burden") is determined and is added to the incremental burdens associated with any previously defined layers and the sum, i.e., the accumulated burden, is compared to the target burden for the hypothetical borehole. If the accumulated burden is less than the target burden, another layer is defined and the average height of the planes is recalculated and the borehole length and explosive loading therein is revised with each additional layer. When the accumulated burden matches the target burden associated with the hypothetical borehole, the position of the borehole is determined between the intermediate boundary and the distant boundary of the last defined layer and the method can be re-initiated to determine the best position for the next borehole. The resulting drill pattern is evaluated with regard to predetermined blast constraints, e.g., minimum and maximum values for hole-to-rock face burden ("B"), hole spacing ("S"), uniformity, etc., and adjustments are made where necessary to conform the drill pattern to the constraints.

After the boreholes have been drilled in the positions specified according to the method described herein, they may be surveyed using a device such as the BORE-TRAK® system. Such hole-surveying devices allow the user to determine the degree to which the borehole, as drilled, has deviated from the planned position. For example, a borehole that was intended to be perfectly vertical may have veered off in one direction or another. The BORETRAK® system allows the user to determine the actual configuration of the borehole. Then, the present invention provides a method by which deviations in the burden associated with the borehole resulting from the non-ideal configuration of the borehole can be accounted for.

In accordance with the present invention, a borehole can be analyzed on a section-by-section basis to determine the rock burden associated with each segment. The present invention then provides that an explosive material having sufficient output energy to accommodate the burden associated with a given section of borehole can be loaded into that section. In this way, drilling deviations that would otherwise lead to burden-associated anomalies, such as inappropriate rock size distributions, can be ameliorated by the blast operator, thus keeping post-blast operations running smoothly.

Another aspect of the present invention relates to the Applicant's realization that a target rock burden for a borehole in a predetermined drilling pattern for use with a specified explosive material can be related to the explosive material on a scaleable basis that allows the user to vary or revise the drilling parameters (borehole diameter, spacing, hole-to-rock face burden, etc.), including the choice of explosive material, to obtain successful outcomes without undue experimentation. The scaled relationship between rock burden and explosive material is referred to herein as the Material Factor and is abbreviated "MF", and can be expressed in, and converted among, analogous expressions such as the "volume MF" (mass of rock (rock burden) per unit volume of explosive material) or "mass MF" (rock burden per unit mass of explosive material). By determining mass MF or volume MF that yield successful blast results for a given blast site and explosive material, blast design criteria (such as borehole diameter, spacing and hole-to-rock face burden) can be varied and comparable results can be obtained by maintaining the appropriate MF. For example, a target mass MF of 2.5 tons per pound explosive may have been derived from previous success in the use of a drilling pattern where the hole-to-hole spacing S=13 feet and the front burden B=16 feet. If it is desired to reduce 13 to 14 feet, this change may be accommodated by changing the other blast site criteria to maintain the mass MF in the desired range, e.g., by increasing 5 to 14.86 (=13×16/14) where the height and diameter of the borehole are unchanged. Typical burdens associated with the use of 94% ammonium nitrate and 6% fuel oil (ANFO)-loaded boreholes translate to a mass MF of from about 0.8 to 3.5 tons of rock per pound ANFO. Since ANFO is so well-known and economical, and since successful blast site criteria have been established for ANFO, ANFO is referred to herein as a "known" explosive material and it is often the starting or reference material for planning a blast pattern and for evaluating reference Material Factors in accordance with the method of the present invention. However, any known explosive material may serve as a reference material in the manner described herein.

According to one aspect of this invention, appropriate blast pattern criteria can be forecast for an unknown or "substitute" explosive material by relating the amount of substitute material to a corresponding quantity of a known explosive material by reference to the specific energy of each material. The term "specific energy" refers to a relationship between a quantity of explosive material and the explosive energy it releases. Specific energy may be expressed in terms of energy per quantity (either mass or volume) of explosive material. Unless otherwise stated, the term "specific energy" encompasses energy per unit mass of explosive material (e.g., calories per gram (cal/g)) and/or energy per volume of explosive material (e.g., cal/cc). These may be differentiated as "specific mass energy" and "specific volume energy", respectively. For example, ANFO is known to have a specific mass energy of 880 calories per gram (880 cal/g), equivalently stated as 400 kcal/lb; 722 cal/cc and 2.045 kcal/cubic foot. The relation of a quantity of a substitute explosive material to a corresponding quantity of a known material can be achieved by multiplying the quantity of substitute explosive material by the relative specific energies of the substitute and the known explosive materials. Emulsion-type explosive materials, which are well-known in the art, may be used as substitutes for ANFO, as may blends of ANFO with an emulsion. For example, to plan for the use of 45 pounds of a substitute explosive material "G" in place of standard ANFO, e.g., an ANFO-emulsion blend having a specific mass energy of 760 cal/g (=3.45×10$^5$ cal/lb), the 45 pounds of G is related to a corresponding quantity of ANFO of about 39 pounds as follows:

45 lbs "G"×(3.45×10$^5$ cal/lb "G")/(4×10$^5$ cal/lb ANFO) =38.9 lbs ANFO. The blast site criteria can then be established as if the load of explosive material was 39 pounds of ANFO, e.g., by employing a previously known ME for ANFO.

According to still another aspect of the present invention, the energy released by an explosive material can be related directly to a burden to be blasted. This allows flexible planning of blast site criteria for known explosive material and allows predictable substitutions for explosive materials. According to this aspect of the invention, the mass of rock associated with a quantity of a known explosive material to yield a suitable MF can be related to the energy released by the explosive material. This relationship is referred to herein as the Energy Factor ("EF"). For example, a Material Factor of MF=2.5 tons rock per pound ANFO can be translated to an Energy Factor EF of (2.5 tons rock/lb)×(2000 lbs per ton)× (1/(4×10$^5$ cal/lb))=0.0125 lbs rock/cal. The Applicant has realized that drill pattern criteria, including the explosive material to be used, can be changed from an approved configuration and acceptable results can be expected as long as the Energy Factor is maintained at an appropriate value.

The use of Energy Factor as a blast criterion simplifies the evaluation of drill pattern parameters since it allows for consistency in results without requiring that a quantity of one explosive material be expressed as a corresponding quantity of another material.

One strategy for using the Energy Factor EF is to specify a borehole pattern (i.e., the spacing, hole-to-rock face burden, and explosive column diameter and height), calculate the rock burden associated with a borehole and then, based on a previously determined Energy Factor EF, determine the amount of energy required to successfully blast that rock burden. The required quantity of any explosive material whose specific energy is known can then be determined. The borehole can be sized to accommodate the required quantity of explosive material. Conversely, if the borehole size is predetermined, the other drill pattern specifications can be adjusted and/or an explosive material can be selected so that the EF for the site is within the desired value.

The invention will be understood in greater detail by reference to the following Examples, which make reference to the Figures. FIG. 1 provides a perspective view of the rock face and indicates various bench characteristics and drill pattern characteristics that are relevant to the present invention as well as to the prior art. For example, FIG. 1 indicates bench characteristics such as bench height (also known as "face height") 10, floor or final grade 12, toe 14, the crest 16, and bank angle 18, and drill pattern characteristics such as borehole diameter 20, hole depth 22, explosive column height 24, stem height 26, subgrade or subdrilling 28, spacing ("S") 30 from one hole to the next on a drill line, back break 32, side break 34, burden ("B", "hole-to-rock face" burden or "front burden") 36, bottom hole burden 38, burden (drill line-to-drill line burden) 40, drill line 42, start point 44 and end point 46.

Material Factors and Energy Factors are also drill pattern characteristics. It will be noted that the term "burden" is used in the art in several senses. To avoid confusion herein, the term "hole-to-rock face burden" (B—a distance) shall refer to the distance from the borehole to the crest of the rock face and the term "rock burden" ($B_T$—a volume) shall indicate the amount of material to be blasted by a given hole. Other senses of the term "burden" will be apparent from the context of use.

Figure 2:
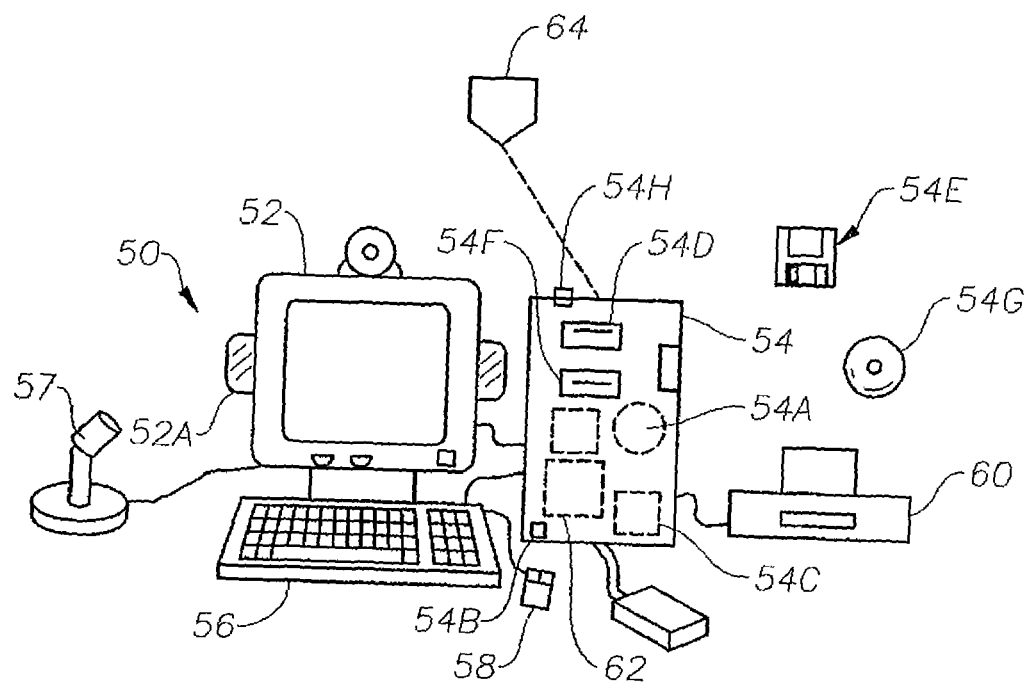
FIG. 2 is a schematic representation of a computer system suitable for the practice of the present invention.

It will be understood that the methods described herein can be implemented as a computer program that can receive blast site data from user inputs and from devices such as the QUARRYMAN® and BORETRAK® systems and that can be configured to produce a variety of reports presenting the end result of the various calculations described above. A programmer of ordinary skill in the art will be able to create a pro-gram to perform the functions described herein without undue experimentation. FIG. 2 shows a general purpose computer system 50 comprising a video display 52 (which may optionally comprise a touch-sensitive or light-sensitive screen and thus constitute a combined input/output device), a computer unit 54 that comprises a central processing unit (CPU) 62 and a variety of conventional storage media on which a computer program and related data for practicing this invention can be recorded and accessed by the CPU. Such storage media are well-known in the art; typical examples are an internal hard drive 54a, read only memory (ROM) 54b (which may be provided in any of a variety of ROM types known in the art, e.g., PROM, EPROM, etc.), random access memory (RAM) 54c, a "floppy" disc drive 54d for utilizing a floppy disc 54e, a compact disc (CD) drive 54f for utilizing a CD 54g, etc. The system 50 includes user input devices including a keyboard input device 56, microphone 57 and a mouse input device 58, and output devices such as a printer 60, the display 52, and one or more audio speakers 52a. Components such as modems, communication ports (e.g., comm port 54h), touch screens, disc drives, etc., can be also used as input devices to provide data to the computer. FIG. 2 also indicates that computer system 50 can be connected in a conventional manner to a surveying device 64 such as the QUARRYMAN® device referred to herein to provide data comprising a digitized model of the bench and rock face.

EXAMPLE 1

Prior Art

Figure 3A:
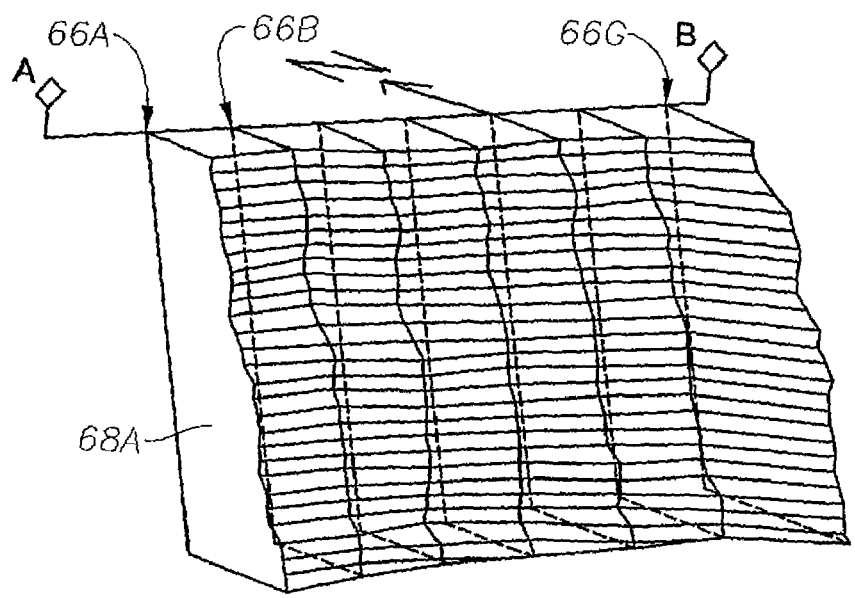
FIG. 3A is a partly cross-sectional, perspective volumetric view of a bench to be blasted using boreholes placed in accordance with the prior art.

In a typical prior art procedure alluded to above, a rock face is surveyed using laser rangefinding equipment such as the commercially available QUARRYMAN® device. Next, rock face profiling software such as FACE 3-D® software available from Blast Design International, Inc. or a similar software program can be used to produce a three-dimensional model of the rock face, from which isometric, plan and cross-sectional views may be constructed. FIG. 3A shows the computer model of the rock face in front of a planned drill line A-B as generated by the FACE 3-D® soft-ware.

Once the rock face has been surveyed, the computer model generated by the software may be used to evaluate borehole positions, spacings, angles, and to calculate the explosive energy distribution throughout the rock mass on a hole-by-hole basis for specified explosives. In a particular example, a drill line A-B indicated in FIG. 3A and a series of seven boreholes 66a, 66b, . . . 66g along the drill line is proposed by the user, based on past experience. The user also indicates the depth of stemming planned for each borehole, the density of the rock and other blast site criteria. The FACE 3-D® soft-ware uses the information provided by the user and can report the expected burden associated with each borehole. The mass of rock associated with a given length of explosive column (L), i.e., the "rock burden", may be calculated as follows:

$$M_{rock} = V \times \rho_R \quad (1)$$

where $$V = B \times L \times S \quad (2)$$

where $M_{rock}$=the mass of rock; V=the volume of rock; $\rho_R$=the density of the rock; and where B=hole-to-rock face burden; L=length of explosive column; S=spacing between adjacent boreholes. The results can be compared against a target rock burden for the given volume of explosive. The FACE 3-D® software also provides a calculation of the burden at various depths along a borehole, based on cross sections of the rock face taken at positions along the drill line that correspond to borehole sites. Accordingly, the FACE 3-D® software will produce a cross section of the bench taken along a plane 68a that is perpendicular to drill line A-B. Plane 68a is bounded by the top surface of the bench, the bank face, the floor or final grade of the blast site and the borehole itself.

A sample drill pattern analysis representative of a FACE 3-D®-type product of the prior art is set forth in the following TABLE I for the seven holes indicated in FIG. 3A.

TABLE I

Details Of Intended Boreholes
(All angles in degrees. All measurements in feet.)
Holes Drilled to 498.0 Elevation at 15° angle

| Hole No. | Distance Along AB | Hole Depth | (Sub Drill) | Bench Height | Minimum Hole-to-Rock Face Burden | Average Hole-to-Rock Face Burden |
|---|---|---|---|---|---|---|
| 66a | 20.0 | 85.0 | 0.8 | 81.3 | 14.2 | 16.5 |
| 66b | 37.0 | 84.5 | 1.2 | 80.4 | 12.3 | 15.4 |
| 66c | 54.0 | 82.5 | 1.6 | 78.4 | 13.5 | 15.6 |
| 66d | 71.0 | 82.0 | 1.1 | 78.0 | 15.0 | 16.2 |
| 66e | 88.0 | 80.5 | 1.9 | 75.9 | 14.7 | 16.8 |
| 66f | 105.0 | 79.5 | 2.3 | 74.6 | 13.4 | 17.5 |
| 66g | 122.0 | 78.5 | 2.2 | 73.5 | 19.4 | 26.5 |

If the user determines that any of the data of TABLE I show that the planned drilling pattern produces a rock burden that is outside of the desired limitations, the user can change one or more drill pattern criteria such as hole spacing and obtain a revised analysis. Although this method is more accurate than other prior art methods for determining rock burdens, the calculations performed by the FACE 3-D® software give at best a rough indication of the actual rock burden associated with a borehole, so the outcome must be viewed with reservations even when it is favorable.

EXAMPLE 2A

One example of a procedure in accordance with the present invention may be based on the following blasting site characteristics:
Face Height (FH) at start point=80 feet
Desired Stein Height (SH)=10 feet
Subdrilling (SD)=5 feet
Bore Hole diameter (d)=6.5 inches (16.5 centimeters (cm))
Explosive=ANFO
(Density(ANFO)($\rho_{EXP}$)=0.82 g/cm³; Specific Energy (ANFO)=880 cal/g)
Desired MF=3 tons rock per pound ANFO
Rock density ($\rho_R$)=2.25 tons/yd³
The optimum positions for boreholes along a selected drill line to achieve proper fragmentation are determined as follows, with reference to FIG. 3B, which represents a portion of the same bench shown in FIG. 3A.

1. The bench, including the rock face, is electronically surveyed and modeled, preferably with optional discount for the presence of residual debris ("muck") that may have been interpreted as solid rock. When modeling is done by digital surveying methods, e.g., by use of the QUARRYMAN® system, the muck can be discounted for by adjusting the spatial coordinates that made the base of the rock face.

2. Blast design parameters such as minimum and maximum borehole spacings, hole angles, hole-to-rock face burdens, explosive properties, rock properties, desired Material Factors and/or Energy Factors are established.

3. The desired drill line and a start point A (FIG. 3B) and end point B thereon are specified.

4. The given borehole diameter is attributed to a hypothetical vertical borehole located at the start point, at which point the borehole is attributed an explosive column length of 75 feet (calculated as the bench height (80 feet) less the planned stem height (10 feet) plus the planned sub-drilling (5 feet)). The resulting hypothetical volume of explosive material is about 17.3 ft$^3$. This corresponds to $4.019 \times 10^5$ g (about 885.2 lbs) of ANFO. Given the Material Factor MF of 3 tons rock per pound ANFO, the initial target rock burden ($B_T$) for this hypothetical borehole is $(3) \times (885.2) = 2655.6$ tons rock or 1180.3 cubic yards rock.

5. The area of a cross section, e.g., cross section Ca-1, of the bench at the start point is calculated and a similar area is calculated for a second cross section Ca-2 parallel to the first at an incremental distance of e.g., 2 feet, along the drill line towards the desired location for the next borehole.

6. The volume of rock between the cross sections, referred to herein as a "layer" of the rock face, e.g., layer La-1, is calculated by multiplying the distance between the cross sections (i.e., the thickness of the layer) times the average of the areas of the two adjacent cross sections that define the layer.

7. The length of the hypothetical borehole and the hypothetical volume of explosive therein are revised based on the height of the last defined plane at the drill line, and the target rock burden is recalculated, based on the revised hypothetical borehole length and desired MF.

8. The mass of rock in the layer is added to all previously defined layers defined from the start point (if any) and the accumulated rock mass is compared to the target rock burden $B_T$.

9. If the accumulated rock mass is less than one-half of the revised target rock burden, another cross section, e.g., cross section Ca-3, and another layer, e.g., layer La-2, are defined and steps 6, 7 and 8 are repeated. In this way, the length, volume and $B_T$ of the hypothetical borehole are updated. When the accumulated rock mass of the defined layers La-1, La-2, etc., reaches or exceeds one-half of the updated $B_T$, the position of the borehole along the drill line is set in the last defined layer, e.g., on or between the intermediate and distant boundary planes of the last layer, e.g., at 66a' (on the distant boundary). Additional layers are defined, one by one, until the total accumulated burden is not less than $B_T$ for the borehole. The distant boundary plane 66ax of the last defined layer is the distant boundary for the burden associated with borehole 66a' and is used to establish a start point and the process is re-initiated to deter-mine the placement of the next borehole. This process assures that the quantity of explosive material in the boreholes is closely matched to the rock burdens associated therewith, and that no layer of rock is associated with more than one borehole. Accordingly, the method of the present invention indicates the placement of boreholes in a manner that helps assure a uniform energy distribution from the explosive material into the surrounding rock.

EXAMPLE 2B

Figure 3B:
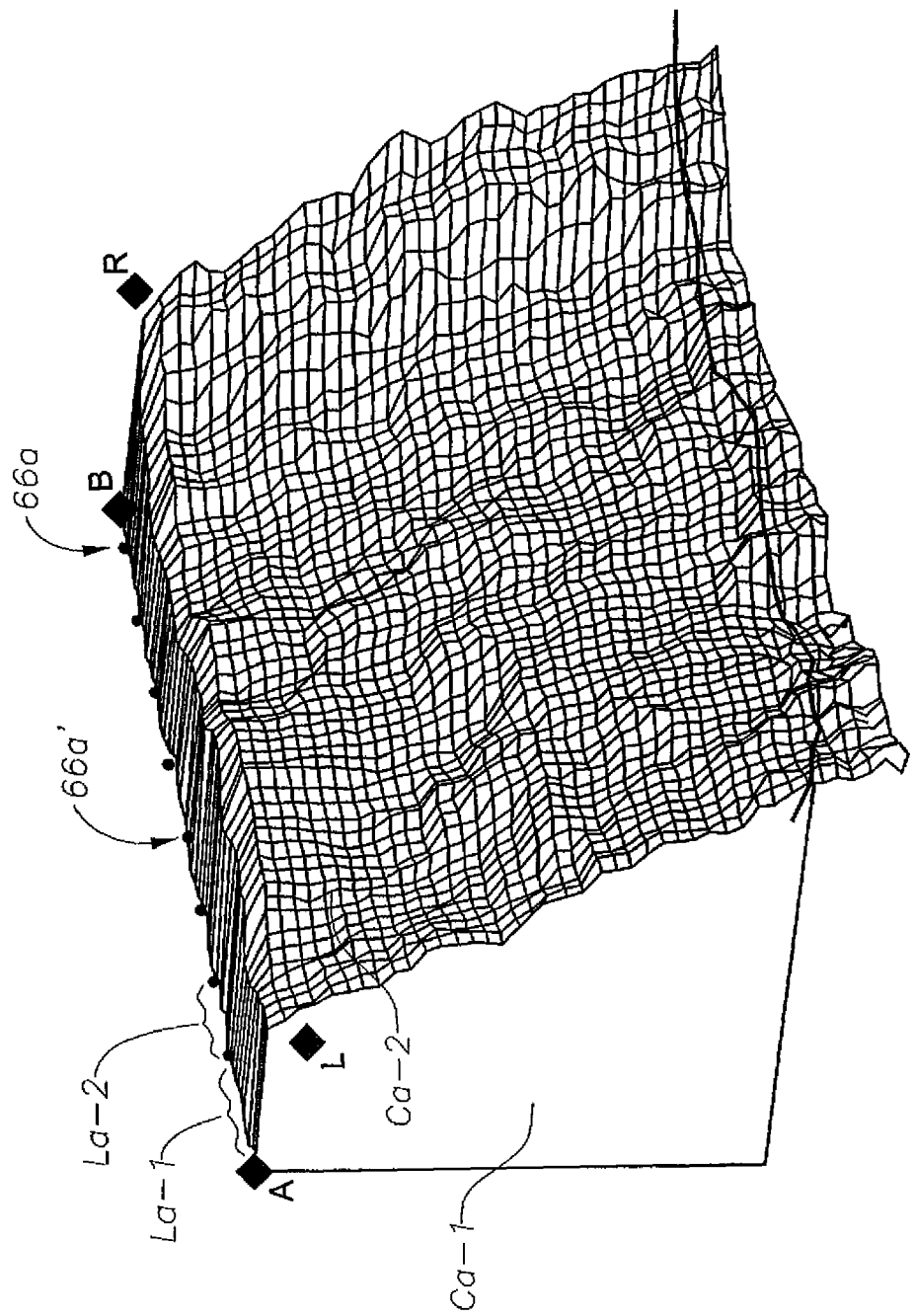
FIG. 3B is a partly cross-sectional, perspective volumetric view of a bench to be blasted using boreholes placed in accordance with the present invention.

An alternative procedure, described herein with reference to FIG. 3B, follows the steps of Example 2A except that instead of steps 7, 8 and 9 of Example 2A, the following steps 7', 8' and 9' are preferred:

7'. The length of the hypothetical borehole and the hypothetical volume of explosive therein are revised based on the average of the heights of the defined cross sections, and the target rock burden $B_T$ is recalculated, based on the revised hypothetical borehole height and desired MF.

8'. The mass of rock in the layer is added to all previously defined layers defined from the start point (if any) and the accumulated rock mass is compared to the target rock burden.

9'. If the accumulated rock mass is less than the revised $B_T$, another cross section and layer are defined and steps 6, 7' and 8' are repeated. In this way, the length and volume of the hypothetical borehole and the associated target rock burden are updated on an iterative basis based on the average heights of all of the defined layers. When the accumulated rock mass of the defined layers reaches or exceeds the updated $B_T$, the position of the borehole 66a' along the drill line is specified as half-way between the start point and the distant boundary plane of the last defined cross section. The distant boundary plane of the last defined layer is then used as a new start point and the process is re-initiated to determine the placement of the next borehole. This process assures that the quantity of explosive material in the boreholes is closely matched to the rock burdens associated therewith, and that no layer of rock is associated with more than one borehole. Accordingly, the method of the present invention indicates the placement of boreholes in a manner that helps assure a uniform energy distribution from the explosive material into the surrounding rock.

EXAMPLE 3A

This Example provides an extension of the method of Examples 2A or 2B for further improving the drill pattern characteristics at the blast site. Once the borehole positions are indicated by the process described in Example 2A or 2B, face profiles, i.e., cross-sectional planes, are characterized for the borehole positions. The hole-to-rock face burden, Material Factor and/or Energy Factor and hole spacing characteristics are calculated for each borehole on a section-by-section basis and are compared against the earlier designated drill pattern or "blast design" constraints. If the blast design constraints have been met consistently, the user may be provided the option of optimizing the cost of the blast as described in Example 3B. If the constraints are not met, an analysis is performed to determined how the deviations can be addressed.

Figure 4:
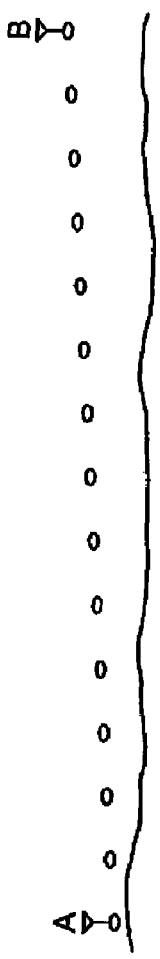
FIG. 4 is a schematic cross-sectional view of boreholes along a drill line angled with respect to a rock face.

In the event that blast constraints have not been consistently met, the drill pattern characteristic can be analyzed to determine whether a change in the position and/or orientation of the drill line would resolve the deviation. For example, the drill pattern characteristics may be examined to see whether the hole-to-rock face burdens were consistently low. If so, the planned position for the drill line may be moved away from the rock face and the iterative calculations of Example 2A or 2B will be repeated to determine new borehole locations. If the hole-to-rock face burdens are consistently high, the drill line may be moved closer to the rock face and the iterative calculations of Example 2A or 2B are repeated to determine new borehole locations. If the hole-to-rock face burdens are not consistently low or high, the deviations are examined to see whether a trend indicates that the drill line is improperly disposed at an angle relative to the rock face, as suggested in FIG. 4. If so, the drill line can be re-oriented and the process of Example 2A or 2B repeated. An angled drill line orientation can be discerned from changes in the ratio of hole spacings to hole-to-rock face burdens for the holes on the drill line.

Figure 5:
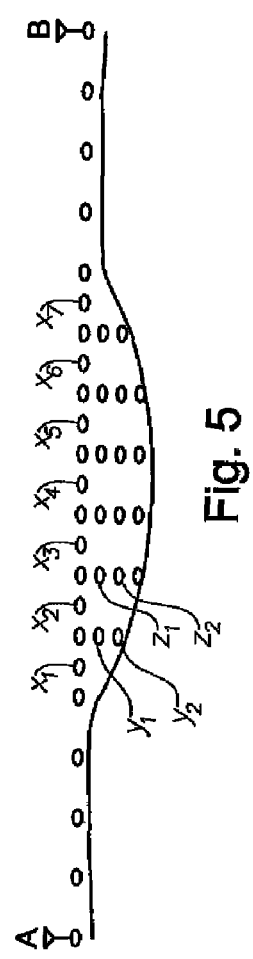
FIG. 5 is a schematic plan view of a bench having a swell in front of a drill line and additional boreholes in the swell, between the drill line and the rock face.

If the deviations cannot be resolved by moving or re-orienting the drill line, the drill pattern characteristics are examined to determine whether rock face irregularities are causing the deviations. In one mode of analysis, the hole-to-rock face burden is calculated at various points along each borehole to determine whether there are significant variations along the length of the borehole. If the rock face is roughly parallel to the borehole, the hole-to-rock face burdens should be nearly uniform along the length of each borehole even when there is a difference in burden from one borehole to the next. In such case, the rock face may have a swell (as suggested in FIG. 5) or a trough. In the case of a swell, the process of Example 2A or 2B would result in a series of boreholes situated close together to offset the increased hole-to-rock face burden. In such case, alternate holes on the drill line ($X_1, X_2, \ldots$) may be eliminated while additional holes ($Y_1, Z_1, \ldots$) are added between the drill line and the rock face. The drill pattern characteristics (e.g., hole locations, burdens, spacing, Material Factor and/or Energy Factors) are recalculated and compared again to the blast constraints. If necessary, further holes can be eliminated and/or additional holes ($Y_2, Z_2, \ldots$) can be situated in the swell region between the drill line and the rock face, as indicated in FIG. 5, until the drill pattern characteristics are within the designated constraints. Conversely, if the rock face has a trough (concave region) relative to the drill line, the calculations of Example 2A or 2B will result in widely spaced boreholes along the trough. In such case, additional boreholes may be added, and/or the hole diameters may be modified, so that maximum spacing constraints are not exceeded and the drill line may then be moved away from the rock face so that the hole-to-rock face burdens in the concave region meet the blast design constraints. The non-concave regions may then have excessive Material Factors but this may be reduced by adding holes between the drill line and the rock face in the same manner as for swells.

Once a drill pattern in which all blast design constraints are met has been established, the actual loading of explosive materials in the holes positioned according to that pattern is determined by examining planar cross sections near and in front of each hole location, and recalculating the drill pattern characteristics to confirm that the blast pattern criteria, especially the MF and/or EF, have been met. Preferably, the drill pattern characteristics and, optionally, the calculations leading thereto are presented to the user as an output.

EXAMPLE 3B

Cost Reduction

The present invention includes a cost reduction procedure which may optionally be used in situations where borehole burdens are not uniform from segment to segment in a borehole even though the drill pattern satisfies the designated blast design criteria. According to this procedure, at least one blast design constraint, e.g., MF, is relaxed. For example, a range of acceptable MF of 1.0 to 2.6 may be specified instead of a particular target value of 2.5. Alternatively, a specific target spacing may be relaxed to allow for spacings that provide a spacing-to-burden (hole-to-rock face burden) in the range of 0.75:1 to 2:1. A hole is hypothetically designated at a minimum allowable spacing from the preceding hole. (The first hole is designated at one-half the minimum spacing, measured from the start point.) The loading of explosive material that would go in the hole is calculated based on planar cross sections of the rock face through and near the hole. The hole is then analyzed to determine whether blasting constraints (e.g., MF) have been met. If so, the cost for filling the hole with the explosive material is calculated and recorded, optionally in terms of dollars per ton of rock burden associated with the hole (dollar burden). The hole spacing may then be increased incrementally (e.g., in 1-foot increments) and the suggested loading and resulting drill pattern characteristics recalculated and compared again to the constraints. The process is repeated until at least one blast design characteristic fails to meet the blast design constraints. At that point, the previously proposed costs are compared and the hole providing the lowest dollar burden is identified. The next hole is then initially positioned at the minimum allowable spacing and the process is repeated until the minimum cost is attained for each hole. At the end of the process, a report indicating the positions of minimum dollar burden and their blast design characteristics may be generated.

EXAMPLE 4

This example illustrates the method described above for accommodating the use of substitute explosive materials at the blast site.

As indicated above, the specific output energy of ANFO is known to be 880 cal/g. When ANFO, which has a density of 0.82 g/cc (51.17 lb/ft$^3$), is loaded in a borehole having a diameter d of 6.75 inches (17.145 cm), the volume of a three-foot section of the borehole is 3 ft×(1/2)(3.145)(6.75 in/12 in/ft)$^2$=0.7455 cubic feet=2.11×10$^4$ cc; which corresponds to about 38.1 pounds ANFO. Suppose that the target rock burden for a three-foot length of the borehole is 72.45 tons of rock. In accordance with the present invention, the target burden is related to the charge of ANFO to establish a Material Factor (MF) for the blast site. In this case, the ANFO MF=72.45/38.1=1.9 tons rock per pound ANFO.

A substitute for standard ANFO, e.g., a mixture of ANFO and an emulsion explosive, having a density ? of 1.17 g/cc and a specific output energy of 812 cal/g, may be accommodated as follows.

A. Retaining borehole size; adjusting the borehole positions to accommodate a substitute explosive material.

The quantity of substitute explosive "S" in the three-foot section of the borehole is M=V?=(2.11×10$^4$ cc)×(1.17 g/cc) =2.47×10$^4$ grams. Given the specific energy of 812 cal/g for the substitute material, the total output energy for this volume of substitute explosive is (2.47×10$^4$ g)×(812 cal/g)=2004×10$^4$ calories. The hypothetical quantity of ANFO that would give the same total output energy is (2004×10$^4$ cal)/(880 cal/g) =22,779 grams or 50.17 pounds ANFO. Using the Material Factor for ANFO given above, the burden for the borehole using the substitute explosive should be 1.9 tons rock per pound ANFO×50.17 pounds=95.3 tons. The drill pattern criteria should be adjusted, e.g., by increasing one or both of the hole spacing, the hole-to-rock face burden, etc., to provide for this increased rock burden.

In an alternative approach, the specific energies of ANFO and of the substitute material can be used to provide a scaling factor, as follows. When filled with the substitute material, the borehole segment will contain (0.7455 ft$^3$)×(1.17 g/cc)×(1/454 g/lb)×(30.48 cc/ft$^3$)=54.4 pounds of substitute explosive material. The corresponding weight of ANFO may be determined by multiplying the mass of substitute explosive (54 lbs) by the scaling factor defined as the specific energy of the substitute material divided by the specific energy of reference material (ANFO), as follows. 54.4 lb "S"×(812 cal/g "S")/(880 cal/g ANFO)=50.2 lbs ANFO. Given the target MF for ANFO of 1.9, the rock burden associated with the substitute explosive in the borehole should be (1.9)(50.2)=95.38 tons. The drill pattern may then be modified to provide this rock burden for the borehole.

B. Maintaining the borehole positions (i.e., the rock burden)

(i). Adjusting borehole size to a substitute explosive material.

If the borehole positions are maintained, the rock burden associated therewith will be constant. Changing the explosive material may therefore require changing the size of the borehole if the EF (or corresponding MF) is to be maintained. One way to determine the size appropriate for the substitute material in accordance with the present invention is to re-size the borehole to accommodate sufficient substitute explosive material to substantially maintain the Energy Factor EF in the desired range.

As indicated above, the Material Factor MF was given at 1.9 tons rock per pound ANFO. The corresponding Energy Factor EF is $(1.9) \times (2000 \text{ lb/ton}) \times (1/454 \text{ g/lb}) \times (1/880 \text{ cal/g})$ =0.0116 pounds rock per calorie. The 72.45 tons of rock associated with a borehole therefore requires (72.45 tons)×(2000 lb/ton)×(1/0.0116 pound/cal)=$1.25 \times 10^7$ cal for proper fragmentation. The quantity of substitute material required to provide this much energy at 812 cal/g is 15,383.5 grams, which corresponds to a volume of 13,150 cc=0.465 ft$^3$. To provide this volume in the three-foot section of the borehole, the diameter d would have to be $d=[0.465 \times (1/3.1415)]^{1/2}$=0.385 ft=4.62 inches.

(ii). Choosing an alternate explosive material when borehole positions and sizes are fixed.

Suppose a borehole is drilled and, because of deviation from the drilling, the target MF of 1.9 tons rock per pound ANFO is exceeded significantly in a particular 3-foot segment having a rock burden of 75.45 tons associated therewith, e.g., the MF turns out to be 2.4. A substitute explosive can be identified as follows. Determine the Energy Factor corresponding to the target MF as well as the amount of energy that would be released by ANFO at the target rock burden for that three-foot section of borehole. For example, (75.45 tons rock)/(19 tons rock/lb ANFO)×(454 g/lb)×(880 cal/g) =$0.587 \times 10^7$ cal would be released by ANFO in that segment of the borehole. The volume of substitute material that would fill the 3-foot section of borehole is determined and the corresponding specific volume energy needed to blast the rock burden is found. By referring to stored data of explosive materials, a substitute material having the needed specific energy can be identified.

EXAMPLE 5

Figure 6:
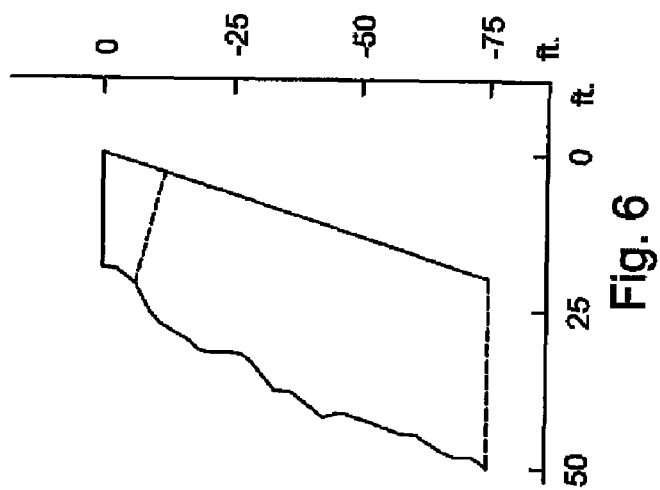
FIG. 6 is a schematic cross-sectional view of a bench taken along a plane through a borehole in the bench.

This Example illustrates how the present invention can be used to determine the loading of various explosive materials in a borehole. FIG. 6 represents a cross section of a rock face taken along a borehole 18 at a blast site. The borehole is drilled at an angle of about 15 degrees from vertical. Surveying equipment such as the QUARRYMAN® system may be used to calculate the hole-to-rock face burden and rock burden for 3-foot segments of the borehole. (The rock burden associated with a segment of a borehole may be described as the mass of rock in the portion of the bench whose height and position correspond to the location of the borehole segment and whose top and bottom surfaces are parallel to each other and horizontal and whose side surfaces are defined by the rock face, the cross-sections of the bench at the start point and the stop point associated with the borehole (i.e., at the burden boundaries) and by a plane at the drill line and at the hole angle. As an optional alternative, an iterative, layer-by-layer method for determining the burden as described herein can be used.) The data of TABLE II show the hole-to-rock face burden for the various segments and their associated Material Factor. It was established by the user that the Material Factor for this blast should be between 2 and 3 tons rock per pound ANFO.

TABLE II

Burdens at Various Depths: Borehole of FIG. 6

ANFO

| Point (feet) | Depth (feet) | Hole-to-Rock Face Burden (feet) | MF ANFO (Actual) |
|---|---|---|---|
| 1 | 0 | 18.5 | **** |
| 2 | 3 | **** | **** |
| 3 | 6 | 17.7 | **** |
| 4 | 9 | 17.9 | **** |
| 5 | 12 | 19.3 | 2.14 |
| 6 | 15 | 21.8 | 2.41 |
| 7 | 18 | 23.6 | 2.8 |
| 8 | 21 | 24.4 | 2.7 |
| 9 | 24 | 25.1 | 2.78 |
| 10 | 27 | 25.5 | 2.82 |
| 11 | 30 | 24.8 | 2.74 |
| 12 | 33 | 24.2 | 2.68 |
| 13 | 36 | 24.9 | 2.75 |
| 14 | 39 | 26.5 | 2.92 |

SUBSTITUTE EXPLOSIVE

| Point (feet) | Depth (feet) | Hole-to-Rock Face Burden (feet) | MF ANFO SCALED (Equivalent) |
|---|---|---|---|
| 15 | 42 | 28 | 2.38 |
| 16 | 45 | 27.7 | 2.36 |
| 17 | 48 | 28.6 | 2.44 |
| 18 | 51 | 29.5 | 2.51 |
| 19 | 54 | 28.4 | 2.42 |
| 20 | 57 | 28.1 | 2.4 |
| 21 | 60 | 27.9 | 2.37 |
| 22 | 63 | 28.2 | 2.4 |
| 23 | 66 | 28.4 | 2.42 |
| 24 | 69 | 27.8 | 2.37 |
| 25 | 72 | 28.2 | 2.4 |
| 26 | 75 | 28.7 | 2.44 |
| 27 | 78.1 | 28.9 | 2.46 |

It can be seen from TABLE II that the hole-to-rock face burden generally increases with the depth of the borehole (except at the 11-13 foot range), suggesting an increase in rock burden as well. Acceptable Material Factors were achieved for ANFO to a depth of about 40 feet (measuring points 1-14). Beyond that depth, the rock burden and therefore the Material Factor became excessive in relation to ANFO and another explosive material (an emulsion-type material) was evaluated. Scaled Material Factors were calculated based on the known density and specific energy of the substitute material, and the results are set forth in TABLE II in connection with measuring points 15 through 27. As seen from TABLE II, by employing the substitute explosive material, the Scaled Material Factor was maintained within the desired range. This example illustrates a method for the use of substitute materials to assure proper fragmentation even when burdens vary within a borehole to a degree that a reference explosive material would not function adequately.

The selection and distribution of explosive materials and stemming in a borehole is referred to herein as the "loading configuration" of the borehole. If a loading configuration permits the borehole to satisfy the blast design criteria, the loading con-figuration is referred to as "a compliant loading configuration".

The various explosive materials that are considered for use in the borehole, e.g., the reference material and the acceptable substitutes therefor, are sometimes referred to herein as "candidate explosive materials". In a computerized embodiment of this invention, the computer system will include a database of candidate explosive materials and associated pertinent data such as cost, density, specific energy, etc. The use of stemming may be indicated for a segment of a borehole for which all of the candidate materials appear to be excessively energetic, i.e., for which all candidate materials do not meet the minimum energy factor criterion assigned to the borehole. On the other hand, if even the most highly energetic candidate explosive material fails to comply with the maximum energy factor criterion, the system can so indicate. For example, the system may generate a message that the appropriate material is "un-known", i.e., that no satisfactory material is included in the database.

Generally, this method may be referred to as a priority-directed loading evaluation and it may comprise considering candidate materials in order of any pertinent characteristics. In a priority-directed loading evaluation, materials may be prioritized in order of sensitivity, stability, or any other pertinent characteristic, and are evaluated for use in the borehole or in a segment of the borehole in order of their priority. The first compliant loading configuration generated therefrom may be referred to as the priority-directed loading configuration. In referring to particular embodiments of the method, the priority characteristic is specifically identified, so the method can be referred to by replacing the term "priority" with the characteristic of interest. Thus, the evaluation of the candidate explosive materials in order of cost per unit mass is referred to herein as a "cost-directed evaluation", and the first compliant loading configuration generated therefrom is referred to herein as the "cost-directed loading con-figuration". The evaluation of candidate materials in order of stability would be referred to as a "stability-directed loading evaluation" and the first compliant loading configuration generated therefrom would be identified as a "stability-based loading configuration". Other priority-directed loading evaluations and the initial compliant loading configurations produced therefrom would be similarly named. It should be noted that a priority-directed loading evaluation does not include relocating the borehole on the drill line.

EXAMPLE 6

This Example illustrates how the procedures of the present invention can be used to attain a desired Energy Factor in a blast hole through the use of mixtures of two or more explosive materials, given a desired Material Factor based on ANFO. To illustrate this embodiment, we shall use the following criteria.
Rock Density ?=2.23 tons per yd$^3$=0.0826 tons per ft$^3$
Material Factor MF=2.5 tons rock per pound ANFO (per 553.66 cc ANFO)
Hole-to-rock face burden B=14 ft
Hole Spacing S=16 ft
Borehole Diameter d=4.5 inches=0.375 ft=11.43 cm
Borehole Segment L=1 ft=30.48 cm Given the criteria listed above, the rock burden associated with the one-foot length L of the borehole is calculated as (1 ft)×(14 ft)×(16 ft)×(0.0826 tons/ft3)=18.5 tons.

The volume of explosive material in the one-foot length of borehole is 0.1104 ft$^3$=3078.44 cc. Given the density of ANFO at 0.82 g/cc, the quantity of ANFO in the 1-foot borehole segment will be 2566.5 g (=5.65 lbs). This translates to an MF of (18.5/5.56)=3.18 tons rock per pound ANFO, a figure that exceeds the target MF and that indicates that ANFO would be insufficient to produce the blasting results desired, using the given blast site criteria. To achieve the desired MF, it will therefore be necessary either to use a greater quantity of ANFO or to use an explosive with a greater specific volume energy than ANFO. To identify the required material, it is necessary to determine the amount of energy that must be provided by the explosive material in that segment of the borehole.

As calculated above, the target MF would require 7.4 lbs ANFO which, given the specific energy of ANFO of 880 cal/g, (399,520 cal/lb), would provide (7.4 lbs)×(399,520 cal/lb)=2,956,448 cal. This is the output energy that must be provided by the explosive material in the 1-foot segment of the borehole (3078.44 cc) to attain an Energy Factor that would result from the desired Material Factor of 2,5. For the material in the one-foot segment of the borehole, this corresponds to a specific volume energy of 960.4 cal/cc.

Figure 7:
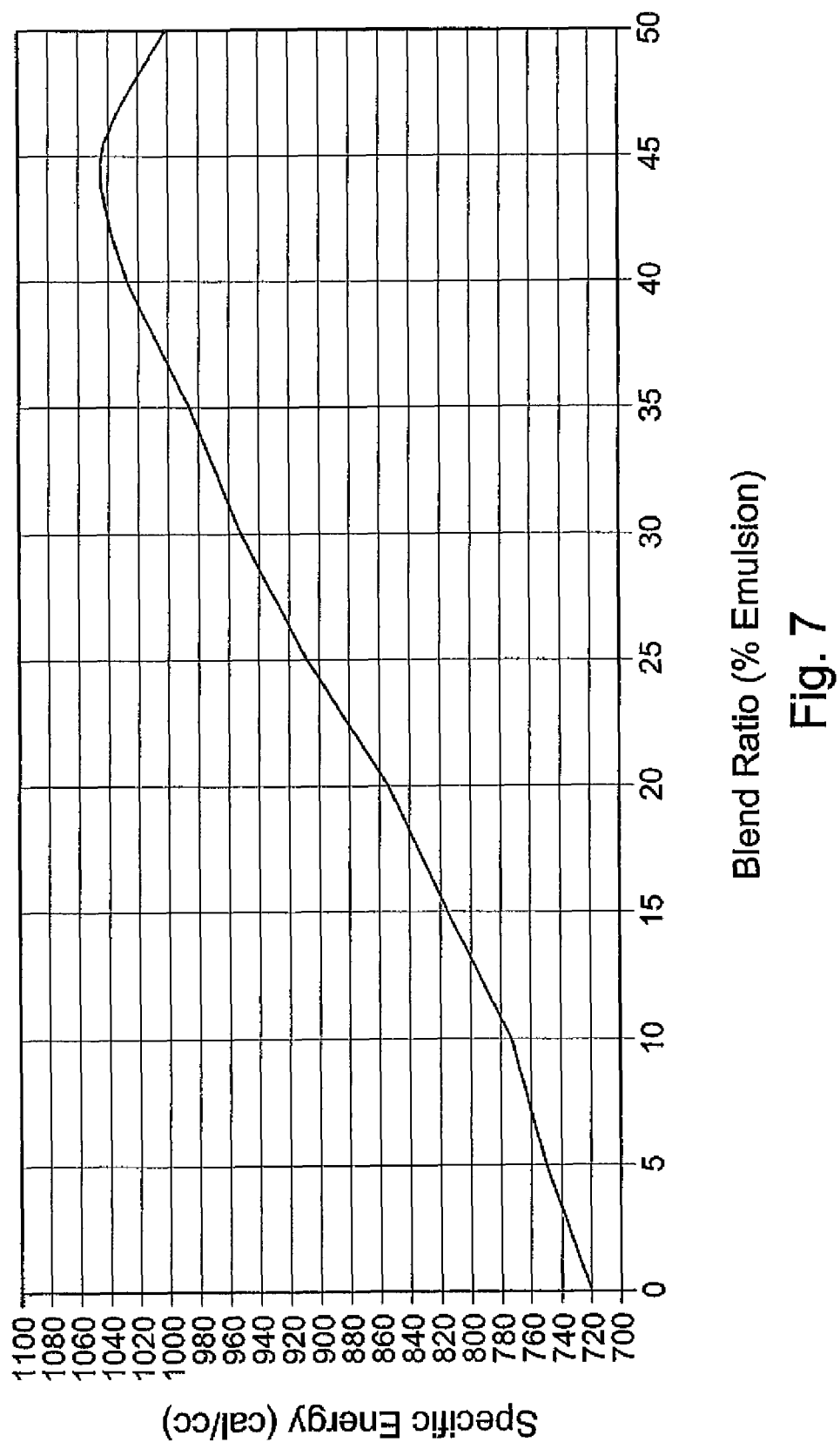
FIG. 7 is a plot of a specific energy vs. blend ratio for blends of ANFO and an emulsion-type explosive material.

Having determined the specific volume energy required, a suitable explosive material can be chosen. FIG. 7 provides data in the form of a chart showing the relation between energy per unit volume (i.e., specific volume energy) and composition for typical blends of emulsion explosive and ANFO; such data can be provided in digital form for use when the foregoing procedure is performed on a computer.

Figure 8A:
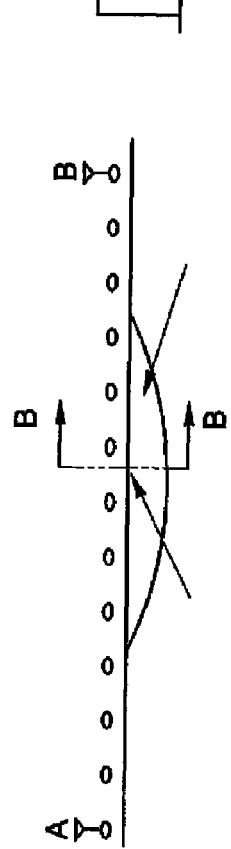
FIG. 8A is a schematic plan view of a bench having an excess toe burden.
Figure 8B:
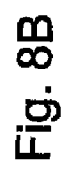
FIG. 8B is a schematic cross-sectional view of the bench of FIG. 8A taken along line B-B.

Each part of the borehole can be analyzed in this way so that the explosive materials therein provide a uniform Energy Factor throughout the rock face to accommodate for variations in burden along the length of the borehole as may occur with a bench having an excess toe burden as suggested in FIGS. 8A and 8B.

When a number of explosive materials are suitable, it may be desirable to refer to data indicating the costs of the materials and to indicate those that provide the desired output energy for the lowest cost.

EXAMPLE 7

Another aspect of the present invention relates to generating a series of compliant, cost-directed loading configurations of a borehole in a cycle of iterations of the method in Example 5 for various possible spacings for the borehole from the burden boundaries, and identifying the spacing with the most cost-effective compliant loading configuration. That borehole spacing is referred to herein as the cost-directed spacing. The method of this aspect of the invention is represented in flow chart form in FIG. 9, and the following description of the method will relate to the flow chart. The method may be implemented as a computer program by one of ordinary skill in the art and may be provided as a module available with the other computerized methods described herein. This method may optionally be used in conjunction with the method described in Example 3B.

First, the blast design constraints including minimum and maximum hole spacing, minimum and maximum Energy Factors, stemming depth from surface, hole configuration (i.e., hole diameter, drilling angle, etc.), and a selection of candidate explosive materials are determined and, in a computerized embodiment of the invention, data relating thereto are entered into the computer (steps 110 and 112). The design criteria include pertinent characteristics of the candidate explosive materials, including cost, density and specific energy.

Figure 9A:
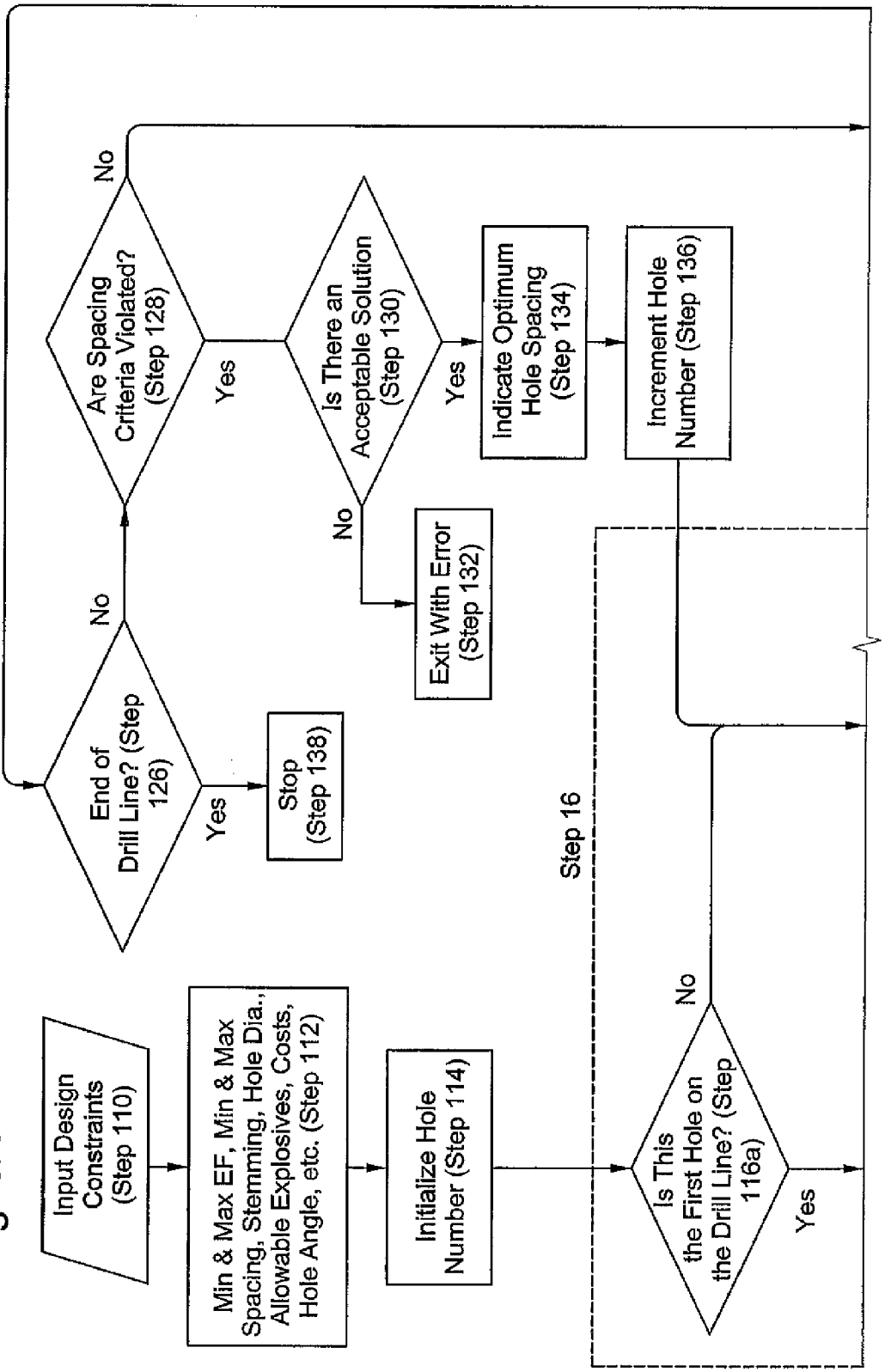
FIG. 9 is a flow chart illustrating the method for identifying a cost-directed spacing for at least one borehole on a drill line in accordance with one aspect of the present invention.
Figure 9B:
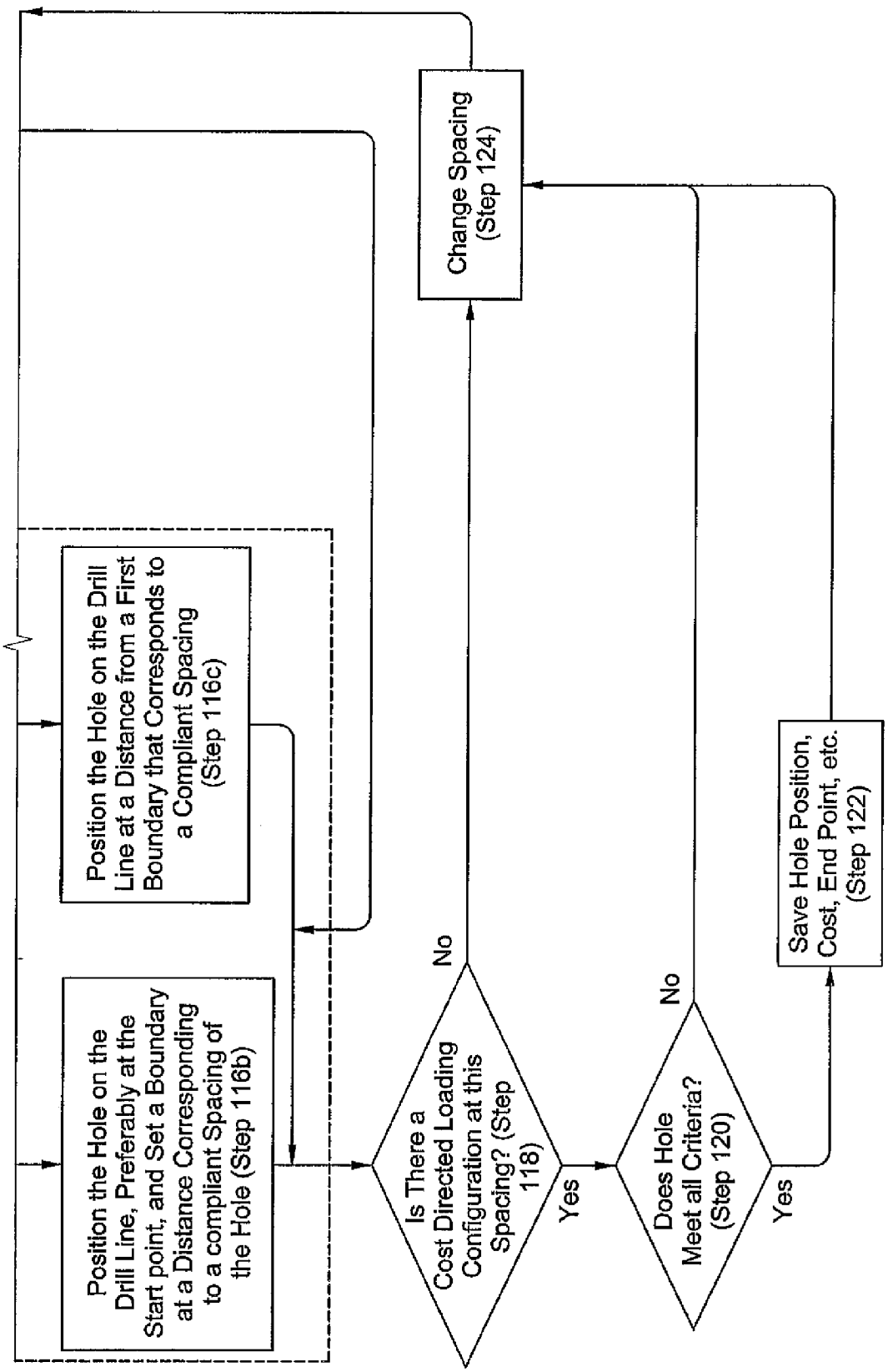

Before the first iteration, a borehole counter is initialized (step 114). The cost-directed evaluation according to this method then comprises proposing a compliant spacing for a borehole on the drill line with reference to at least one associated burden boundary (step 116). By proposing a compliant spacing, relative positions of the borehole and at least one burden boundary are established on the drill line at a mutual distance of one-half of the proposed spacing from the borehole. The rock burden on one side of the borehole between the borehole and the burden boundary is then associated with the borehole. A like burden on the other side of the borehole is also associated with the borehole and is defined by a boundary at a like distance from the borehole, i.e., that the borehole is at the linear center of the associated rock burden. In the case of the first borehole, proposing a compliant spacing may comprise setting the position of the borehole (typically but optionally at the start point of the drill line) and then setting a first boundary for the rock burden to be associated with the borehole at a distance along the drill line of one-half of the proposed spacing, as in steps 116*a*, 116*b*. Since the rock burden on the side of the borehole opposite the first boundary may be undefined (e.g., the bench may not have been surveyed in that direction), it may be assumed that the burden associated with the first borehole is the same on both sides of the borehole. Alternatively, the first boundary of the first borehole may be set on the drill line, e.g., at the start point. Proposing a spacing for the first borehole is then like proposing a spacing for a subsequent borehole: the first boundary is deemed to be fixed in position on the drill line and the borehole is set at a distance from the first borehole corresponding to one-half of a compliant spacing. A second boundary is set at a like distance on the other side of the borehole (FIG. 9, step 116*c*). The burden associated with the borehole would then be defined by the two boundaries and the borehole will be situated at the linear center between the boundaries. A cost-directed loading evaluation is then performed, as shown in Example 5 (step 118). If a compliant cost-directed loading configuration is found, and the borehole meets the blast design criteria (query 120), the pertinent descriptive data are indicated, e.g., displayed, reported and/or recorded (step 122), preferably including a dollar-per-burden ton cost assessment of it. The borehole-boundary spacing is then changed (step 124). In the case of a first borehole in which the position of the borehole is fixed, this may mean moving at least one boundary relative to the borehole while keeping the borehole set in place on the drill line. Otherwise, this may mean moving the borehole and the second boundary relative to the first boundary. In the case of a subsequent borehole, the first boundary will coincide with the distant or second boundary of the previous borehole. The increment of the spacing preferably corresponds to the width of a layer of the bench, as described above. If the resulting spacing does not exceed either the minimum or the maximum allowable spacing criteria and does not position the borehole beyond the end of the drill line (queries 126 and 128), another iteration of the cost-directed loading evaluation is performed for the borehole with the new spacing (step 118). The potential spacing is incremented and iterations are performed until an incremented location exceeds the end of the drill line (at which point the evaluation cycle is complete) or one of the spacing criteria (queries 126 and 128). Otherwise, the process is stopped (step 138). A cycle of this method will thus typically generate a series of loading configurations for various potential spacings for the borehole, and will have recorded the associated cost and other descriptive data pertaining thereto. It will be understood that the order in which spacings are evaluated is not critical to the practice of this method. Preferably, however, the first proposed spacing corresponds either to the minimum or the maximum spacing criterion and each change in spacing is an incremental increase or decrease towards the other criterion.

If there were no spacings with compliant loading configurations (query 130), an error message is indicated and the procedure is stopped (step 132). If there was one or more spacings having a cost-directed loading configuration, the spacing with the lowest dollar-per-ton cost, i.e., the cost-directed spacing, is indicated, preferably with locations of the borehole and the burden boundaries of the associated burden (process 134). Preferably, the pertinent cost data of the indicated borehole are indicated as well. Indicating data may comprise sending or displaying the data to an output device or recording the data for later retrieval. Optionally, data pertaining to non-compliant configurations may be recorded for comparison to the data for compliant loading configurations. The borehole counter may be incremented (step 136) and another cycle of iterations may be initiated to evaluate possible locations for a subsequent borehole on the drill line. For a subsequent borehole, the distant boundary of the previous borehole at its cost-directed spacing is taken as the fixed first boundary of the subsequent borehole. In this manner, the boreholes may be located sequentially at cost-directed spacings.

A particular example of the cost optimization routine described above may be as follows. In accordance with this example, which is based on a model of a particular bench, the blast design criteria for this example are as follows:

Minimum Energy Factor=1.2
Maximum Energy Factor=2.5
Hole Diameter=6.75 inches
Stemming=9 feet
Sub-Drill=2 feet
Minimum Borehole Spacing=12 feet.

Figure 10A:
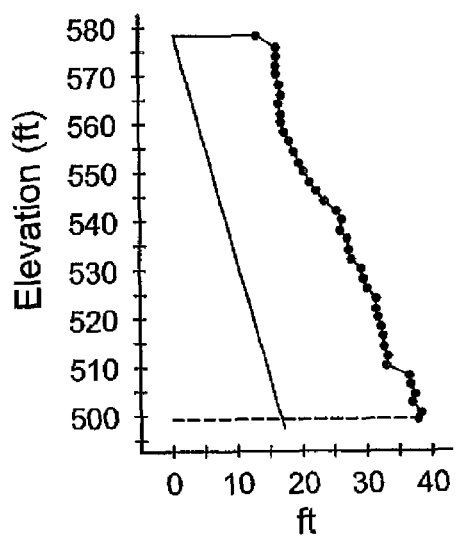
FIG. 10A is a schematic cross-sectional representation of the borehole planned at the 12-foot spacing in Example 7 with the height and thickness of the bench indicated in feet on the vertical and horizontal axes.
Figure 10B:
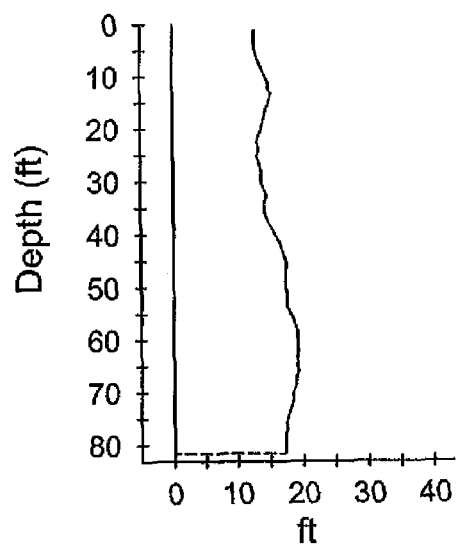
FIG. 10B is a burden chart pertaining to the cross section of FIG. 10A, indicating hole depth on the vertical axis and hole-to-rock face burden on the horizontal axis.

The first potential spacing for the borehole on the drill line is set at six feet (one-half the minimum spacing) from the first burden boundary. A borehole at this first location would be characterized as follows: bench height—79.23 feet; hole depth—82.65 feet; azimuth—0.00; drill angle—12 degrees; vertical depth—80.84. The rock burden associated with this borehole at the 12 foot spacing is 1,317 tons. FIG. 10A provides a cross-sectional representation of the bench and borehole at the first spacing. FIG. 10B provides a representation of the hole-to-rock face rock burden associated with the borehole and indicates the depth of loading of explosive and stemming.

The fixed costs associated with the borehole relate to the use of two cast boosters and two in-hole delay units. Other possible fixed costs may obtain as well, e.g., the accessory cost (booster, delay units, etc.), drilling cost, an allocated portion of the blast design cost, etc., for a total of, e.g., $811.75. (All dollar figures presented herein are provided for illustration purposes only.) The variable cost associated with the borehole relates primarily to the quantity and type of explosive material used. In the present Example, ANFO is currently the least expensive and coincidentally the least energetic candidate explosive material, and so is the first to be considered. The cost of stemming is considered to be negligible in all cases.

The first iteration of the analysis of the borehole at the 12 foot spacing does not yield a compliant loading configuration because when the minimum desired energy factor is satisfied, the ANFO is loaded in the borehole from the depth of 82.65 feet to only 41 feet, so that the stemming exceeds the stated 9 feet criterion. The iteration can be stopped at this point because the other available explosive materials are more energetic than ANFO and would generate similarly unacceptable results. The variable cost for this loading configuration is the cost of filling 41.65 feet of the bore-hole with ANFO ($56.75).

Figure 11A:
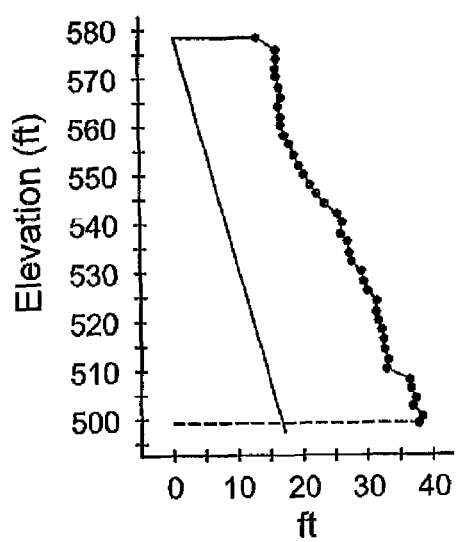
FIG. 11A is a schematic cross-sectional representation of the borehole planned at the 15-foot spacing of Example 7 with the height and thickness of the bench indicated in feet on the vertical and horizontal axes.
Figure 11B:
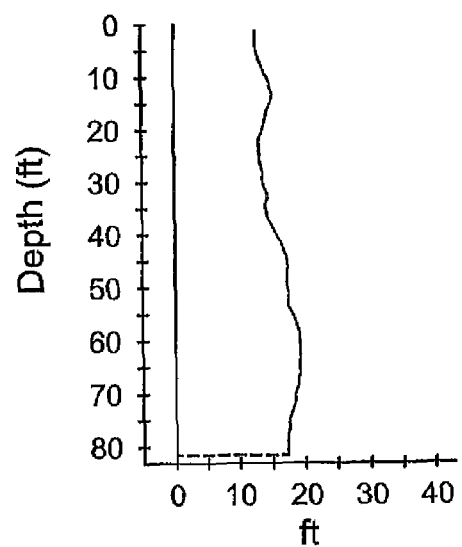
FIG. 11B is a burden chart pertaining to the cross section of FIG. 11A, indicating hole depth on the vertical axis and hole-to-rock face burden on the horizontal axis.

In two subsequent iterations of the method described above, spacings of 13 and 14 feet likewise did not satisfy the blast design criteria. A fourth iteration in the evaluation cycle for a spacing of 15 feet yielded a location for a borehole for which a compliant, cost-directed loading configuration was found. FIG. 11A provides a cross section of the bench at the bench and borehole and FIG. 11B illustrates the hole-to-rock face burden along the depth of the borehole. Numerical values for data represented in FIG. 11B are set forth in the following TABLE.

TABLE III

| Depth | Hole-to-Rock Face Burden |
|---|---|
| 2 | 11.2 |
| 4 | 11.4 |
| 6 | 11.9 |
| 8 | 12.7 |
| 10 | 13.8 |
| 12 | 13.9 |
| 14 | 13.6 |
| 16 | 13.3 |
| 18 | 13.0 |
| 20 | 12.7 |
| 22 | 12.4 |
| 24 | 12.4 |
| 26 | 12.7 |
| 28 | 12.9 |
| 30 | 13.2 |
| 32 | 13.6 |
| 34 | 13.6 |
| 36 | 13.9 |
| 38 | 14.4 |
| 40 | 15.2 |
| 42 | 16.2 |
| 44 | 16.8 |
| 46 | 17.0 |
| 48 | 16.8 |
| 50 | 16.8 |
| 52 | 17.1 |
| 54 | 17.6 |
| 56 | 18.2 |
| 58 | 18.8 |
| 60 | 18.8 |
| 62 | 19.0 |
| 64 | 18.9 |
| 66 | 18.9 |
| 68 | 18.7 |
| 70 | 18.6 |
| 72 | 18.3 |
| 74 | 17.8 |
| 76 | 17.6 |
| 78 | 17.5 |
| 80 | 17.4 |
| 82 | SubDrill |
| 82.6 | SubDrill |

By performing the cost-directed evaluation as described above in Example 5, it was determined that with a 15 foot spacing, the segment of the borehole between the depths of 50 and 82.65 feet would not meet the blast design criteria using ANFO, so a more energetic and expensive material was evaluated. It was found that a thirty percent ANFO-emulsion blend was suitable for this segment in the borehole. For the segment at the depth range of 26 feet to 50 feet, ANFO was suitable. At the depth range of 19 to 26 feet, ANFO exceeded the energy factor criterion so the use of stemming was indicated since there was no less energetic candidate material under consideration. For the segment at the depth range of 9 to 19 feet, ANFO once again met the blast design criteria. Stemming was used for the segment in the range of 0 to 9 feet, pursuant to the blast design criteria. The variable cost or materials cost for this bore-hole was ANFO: $44.03, Thirty percent blend: $83.70; Total, $127.74. The cost per ton of rock burden associated with the hole at 15 feet as described herein was about 0.28 dollars per ton and a total of about 1,635 tons of rock burden was associated with the borehole.

Further iterations at spacing increments of one foot produced a series of compliant, cost-directed loading configurations. The most cost-effective, cost-directed loading configuration, i.e., the cost-directed spacing, occurred at a planned spacing of 27 feet. A borehole at this position drilled to the depth of 82.65 feet with nine feet of stemming would be filled entirely with the thirty percent blend. The resulting cost efficiency was calculated at $0.2384 per burden ton for 2901 tons of rock burden associated with the borehole.

After holes are drilled at the cost-directed spacings, the analysis described in Example 4B(ii) may optionally be performed on one or more of the holes.

While the foregoing description refers to the use of the method of Example 5, which makes use of a prior art method to determine rock burden, the rock burden can optionally be determined using a layer-by-layer approach like that of Example 2A or 2B for calculating the rock burden between the borehole and a first boundary and for setting the second boundary so that the borehole is at the mass center of the burden (i.e., so that the rock burden is the same on both sides of the borehole) instead of the linear center (except in the case of a first borehole having undefined rock burden on one side).

While the invention has been described in detail with reference to particular embodiments thereof, it will be apparent that upon a reading and understanding of the foregoing, numerous alterations to the described embodiments will occur to those skilled in the art and it is intended to include such alterations within the scope of the appended claims.

What is claimed is:

1. A method for choosing at least one explosive material for use in a segment of a borehole, the method comprising:
   determining, by a processor, a target specific volume energy required for an explosive material in the borehole; and
   identifying, by the processor, at least one explosive material that provides at least the target specific volume energy.

2. The method of claim 1 comprising comparing specific energies of candidate explosive materials to the target specific volume energy.

3. The method of claim 2 wherein comparing specific energies comprises referring to stored data that indicate specific volume energies of a plurality of explosive materials.

4. The method of claim 3 wherein the stored data indicate the densities and specific mass energies of the various candidate explosive materials, and wherein identifying an explosive material comprises calculating the specific volume energy of a candidate explosive material and comparing the candidate specific volume energy to the target specific volume energy.

5. The method of claim 1, comprising partitioning the borehole into segments and determining rock burden and target specific volume energy for various segments of the borehole and separately identifying an explosive material for each segment.

6. The method of claim 1 comprising determining the rock burden for the borehole and using a predetermined Energy Factor and the size of the borehole to determine the corresponding specific volume energy.

7. A non-transitory computer-readable medium storing code that, when executed, causes a processor to:
   determine a target specific energy required for an explosive material relative to rock burden of at least a segment of a borehole; and
   identify at least one explosive material that provides at least the target specific energy.

8. The non-transitory computer-readable medium of claim 7 wherein the code, when executed, causes the processor to identify said at least one explosive material by referring to stored data indicating the specific energies of candidate explosive materials and comparing the data to the target specific energy.

9. The non-transitory computer-readable medium of claim 8 wherein the code, when executed, causes the processor to identify said at least one explosive material by referring to data indicating the specific energies of a plurality of blends of two or more materials.

10. The non-transitory computer-readable medium of claim 7 wherein the code, when executed, causes the processor to identify said at least one explosive material by referring to data indicating the densities and specific mass energies of various candidate explosive materials, calculating the specific volume energy of a candidate explosive material, calculating the target specific volume energy and comparing the candidate specific volume energy to the target specific volume energy.

11. The non-transitory computer-readable medium of claim 7 wherein the code, when executed, further causes the processor to determine the rock burden for the borehole and determine the required specific volume energy using a predetermined Energy Factor and the size of the borehole.

12. The non-transitory computer-readable medium of claim 7 wherein the code, when executed, further causes the processor to partition the borehole into segments and determine rock burden and target specific volume energy for various segments of the borehole and separately identify an explosive material for each segment.

13. An apparatus for choosing at least one explosive material for use in at least one segment of a borehole having a rock burden associated therewith, the apparatus comprising:
   a computer processor;
   at least one computer-readable storage medium accessible to the processor and storing code that, when executed, causes the processor to determine a target specific energy required for an explosive material relative to the rock burden and identify at least one explosive material that provides at least the target specific energy.

14. The method of claim 2 comprising partitioning the borehole into segments and determining rock burden and target specific volume energy for various segments of the borehole and separately identifying an explosive material for each segment.

15. The method of claim 3 comprising partitioning the borehole into segments and determining rock burden and target specific volume energy for various segments of the borehole and separately identifying an explosive material for each segment.

16. The method of claim 4 comprising partitioning the borehole into segments and determining rock burden and target specific volume energy for various segments of the borehole and separately identifying an explosive material for each segment.

* * * * *